(12) United States Patent
Yamada

(10) Patent No.: US 8,508,789 B2
(45) Date of Patent: Aug. 13, 2013

(54) DETERMINING A DEGREE OF FIT BETWEEN AN IMAGE DATA INPUT DEVICE AND AN IMAGE DATA OUTPUT DEVICE

(75) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1108 days.

(21) Appl. No.: 11/952,879

(22) Filed: Dec. 7, 2007

(65) Prior Publication Data

US 2008/0137137 A1  Jun. 12, 2008

(30) Foreign Application Priority Data

Dec. 11, 2006  (JP) ................................ 2006-333348

(51) Int. Cl.
*G06K 15/02*  (2006.01)
(52) U.S. Cl.
USPC ........................................................... 358/1.2
(58) Field of Classification Search
USPC ................................................ 358/1.15, 1.2
See application file for complete search history.

(56) References Cited

U.S. PATENT DOCUMENTS 6,023,527 A * 2/2000 Narahara ...................... 382/167
6,563,944 B1 5/2003 Kumada
7,124,212 B2 * 10/2006 Shimizu et al. ................. 710/38
2002/0021321 A1 * 2/2002 Nakajima et al. ............... 347/19
2003/0117642 A1 * 6/2003 Haraguchi .................... 358/1.15
2007/0229880 A1 * 10/2007 Harmon et al. .............. 358/1.15

FOREIGN PATENT DOCUMENTS

| JP | 09-190314 A | 7/1997 |
| JP | 09-198211 A | 7/1997 |
| JP | 11-305970 A | 11/1999 |
| JP | 2000-069455 A | 3/2000 |
| JP | 2005-165855 A | 6/2005 |
| JP | 2005-175875 A | 6/2005 |

* cited by examiner

*Primary Examiner* — Eric A Rust
(74) *Attorney, Agent, or Firm* — Canon U.S.A., Inc., IP Division

(57) ABSTRACT

An image processing apparatus includes a connecting unit configured to connect the image processing apparatus to a network via which a plurality of image output devices can be connected to the image processing apparatus, an input unit configured to input image data, a specifying unit configured to specify an image processing attribute of the input unit, an acquiring unit configured to acquire information indicating a degree of fit between the image processing attribute of the input unit specified by the specifying unit and an image processing attribute of each of the plurality of image output devices, and a display unit configured to display a list of the plurality of image output devices with an indicator of the degree of fit based on the information acquired by the acquiring unit.

10 Claims, 24 Drawing Sheets

_800_

| | 801 | 802 | 803 | 804 ATTRIBUTES | | | 805 | 806 |
|---|---|---|---|---|---|---|---|---|
| | DEVICE NAME | AREA INFORMATION | IP ADDRESS | COLOR PRINTING | TWO-SIDED PRINTING | ..... | COLOR REPRODUCTION RANGE PROFILE | GRADATION CORRECTION HISTORY |
| | DEVICE A | SHINAGAWA 33A | 172.24.165.17 | ○ | ○ | | DEVICE A | 2006.05.23 |
| | DEVICE B | SHINAGAWA 33A | 172.24.165.18 | ○ | ○ | | DEVICE B | 2005.01.20 |
| | DEVICE C | SHINAGAWA 33B | 172.24.165.11 | ○ | ○ | | DEVICE C | 2002.10.01 |
| | DEVICE D | SHINAGAWA 12 MEETING ROOM | 172.24.165.12 | ○ | — | | DEVICE D | NONE |
| | ⋮ | ⋮ | ⋮ | ⋮ | ⋮ | ⋮ | ⋮ | ⋮ |

| DEVICE NAME | AREA INFORMATION | IP ADDRESS | ATTRIBUTES | | | COLOR REPRODUCTION RANGE PROFILE | GRADATION CORRECTION HISTORY |
| --- | --- | --- | --- | --- | --- | --- | --- |
| | | | COLOR PRINTING | TWO-SIDED PRINTING | ...... | | |
| DEVICE A | SHINAGAWA 33A | 172.24.165.17 | ○ | ○ | | DEVICE A | 2006.05.23 |
| DEVICE B | SHINAGAWA 33A | 172.24.165.18 | ○ | ○ | | DEVICE B | 2005.01.20 |
| DEVICE C | SHINAGAWA 33B | 172.24.165.11 | ○ | ○ | | DEVICE C | 2002.10.01 |
| DEVICE D | SHINAGAWA 12 MEETING ROOM | 172.24.165.12 | ○ | — | ...... | DEVICE D | NONE |
| ...... | ...... | ...... | ...... | ...... | ...... | ...... | ...... |

_801_  _802_  _803_  _804_  _805_  _806_

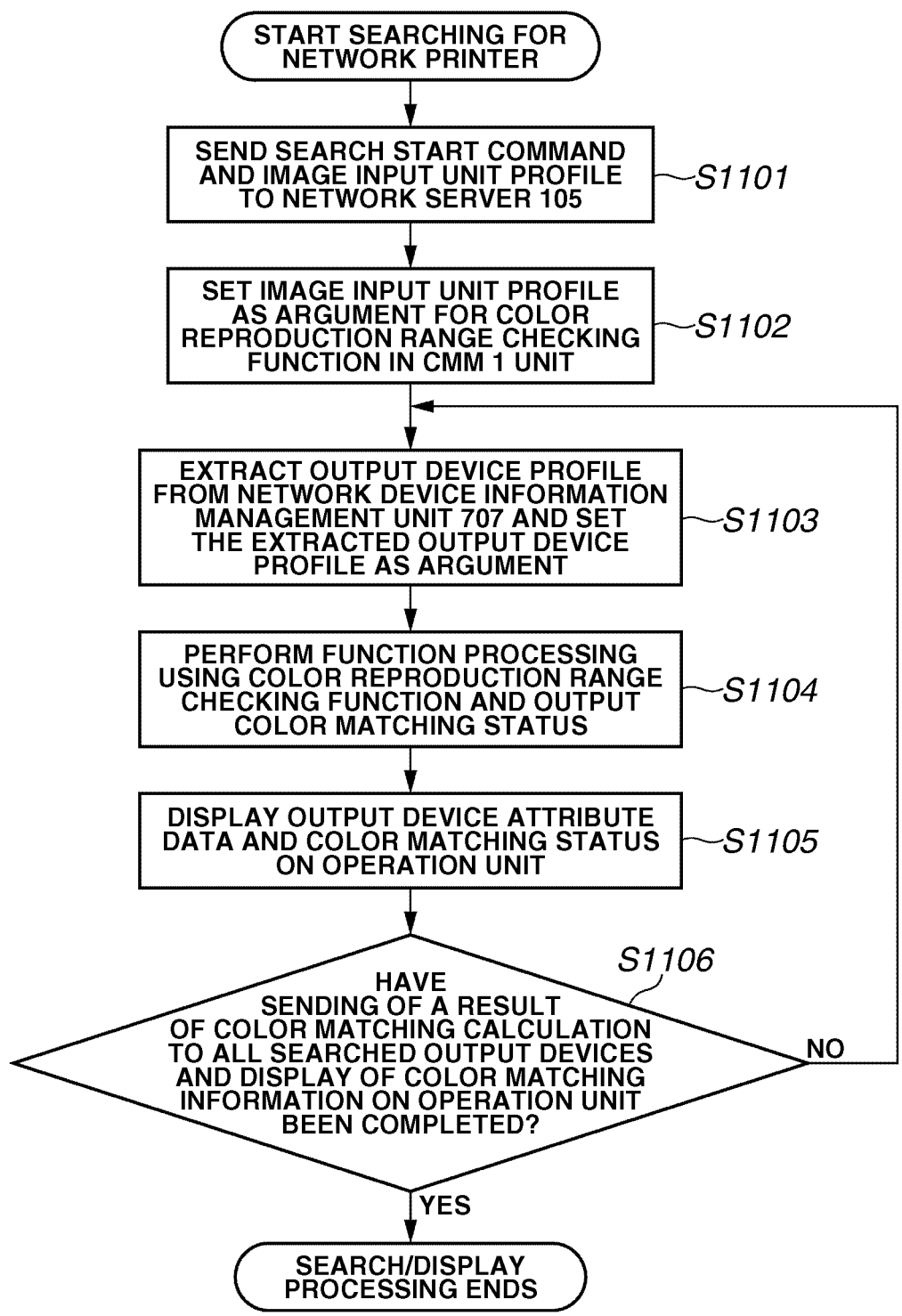

FIG.15

STORAGE MEDIUM SUCH AS FD/CD-ROM

| DIRECTORY INFORMATION |
|---|
| PROGRAM CODE CORRESPONDING TO STEPS IN FLOW CHART OF FIG. 11 |
| PROGRAM CODE CORRESPONDING TO STEPS IN FLOW CHART OF FIG. 13 |

DETERMINING A DEGREE OF FIT BETWEEN AN IMAGE DATA INPUT DEVICE AND AN IMAGE DATA OUTPUT DEVICE

BACKGROUND OF THE INVENTION

1. Field of the Invention

The present invention relates to an image processing system configured to perform image processing with an input device and any of a plurality of output devices on a network operating in cooperation with each other.

2. Description of the Related Art

Conventionally, a range of a color space in which a color is reproduced differs with respect to image output devices (e.g., color printers) according to characteristics of the image output devices (i.e., characteristics of ink or toner and a recording method).

FIG. 16 illustrates an area characteristic of a color space related to color reproduction characteristics of an image output device. Here, "x" and "y" are chromaticity coordinates. Chromaticity coordinates are often used in expressing a color reproduction range of a color device in a two-dimensional area.

Referring to FIG. 16, areas illustrated with solid or broken line polygons each indicate an area for reproducing a color with respect to each of color printers A, B, and C.

As apparent from FIG. 16, the color reproduction ranges are from larger to smaller in the order of the printer A, the printer C, and the printer B. Furthermore, the color reproduction range of the printer A includes that of the printer B. That is, the printer A can reproduce all of the colors that the printer B can reproduce.

FIG. 17 illustrates a structure of a profile of an image output device. More specifically, FIG. 17 illustrates an example of a printer profile structure according to profile specifications defined by the International Color Consortium (ICC).

The profile in FIG. 17 includes a header portion for managing the profile, a tag table including a pointer for accessing tag data, and a tag data storage portion including a required tag, an optional tag, and a private tag.

The header portion includes device information and color management module (CMM) information. The device information describes information about which device (e.g., a monitor) the profile corresponds to. The CMM information describes information about which CMM uses the profile. The tag data storage portion includes profile description information for identifying the profile.

The profile description information can be described as, for example, "CXXXXLBP-2XXXX". That is, the profile description information stores information about a manufacturer name and a product name. The required tag includes a color reproduction range tag which describes information about a color reproduction range of a printer.

FIG. 18 illustrates a data structure of the color reproduction range tag in FIG. 17.

Referring to FIG. 18, color reproduction range tag data includes data for checking whether an input of a device-independent color (a Commission Internationale de l'Éclairage (CIE) color system XYZ or a CIE color system LAB (hereinafter referred to as "L*a*b*")) can be output by a specific printer.

In the case of generating data corresponding to a combination of all inputs, the size of the generated data becomes very large. Accordingly, it is necessary to divide a three-dimensional input color space into a plurality of grid points and allocate the data only with respect to each of the grids. With respect to an input that does not correspond to a grid, it is generally necessary to interpolate the non-grid input with data on surrounding grids to obtain an output thereof.

In the example illustrated in FIG. 18, the input L*a*b* is divided into grid points, and each grid point holds data indicating "ON" if the data can be output by a printer or data indicating "OFF" if the data cannot be output by a printer. Data between grid points is interpolated with data on a grid that is vertices of a cube surrounding the data between grid points. Thus, a result "ON" or "OFF" can be obtained with respect to the data between grid points.

FIG. 19 illustrates a color reproduction range checking function of the CMM.

The color reproduction range checking function is a function for determining a level of a quality of an output in the case where red, green, and blue (RGB) data having a characteristic defined by a source profile (a profile of a scanner or a monitor) is input to the CMM; the CMM outputs an output quality level status based on the input RGB data, a source profile, and a printer profile, and the input RGB data is output by a printer having a characteristic defined by the printer profile.

In the case of outputting input RGB data with a printer, the color reproduction range checking function returns a status of a quality level of the output based on the source profile information and the color reproduction range tag data in a printer profile.

FIG. 20 illustrates an example of processing performed with the color reproduction range checking function in FIG. 19.

Referring to FIG. 20, input RGB data is converted into L*a*b* data based on information included in a source profile (in the example in FIG. 20, based on data used for converting RGB data into L*a*b* data in a device-independent color space)

Then, the converted L*a*b* data is input to the printer, and if it is determined, based on the color reproduction range tag data in the printer profile, that the acquired output quality level status of the printer indicates that the converted L*a*b* data can be output, then the input L*a*b* data is output by the printer.

As described above, it can be determined whether color data can be output by a printer after checking an output quality level status of the printer based on color reproduction range tag data included in a printer profile.

In the case where a user selects either one of a plurality of color printers on a network in a network printing system to output data with the selected color printer, the data may not be printed with the selected printer if the size of the data to be printed is very large or if an error occurs during the print processing. In this regard, Japanese Patent Application Laid-Open No. 11-305970 discusses a method for allowing a user to select a substitute output device, based on a result of a determination as to an output level of a network printer performed according to color reproduction information, in order to correspond to a difference in color reproduction ranges of printers on the network.

Furthermore, another conventional method corrects a gradation to reproduce appropriately colors in an output of a color printer without being influenced by surrounding environments or aging of a printing mechanism.

A method for correcting a gradation in a conventional method will be described below with reference to FIGS. 21 and 22. FIG. 21 illustrates a density characteristic of an output unit of an image forming apparatus.

In FIG. 21, an output density is taken on the ordinate axis. On the ordinate axis, an output density value "0" corresponds to white, and an output density value "255" corresponds to black. A value of data input to the output unit of the image forming apparatus is taken on the abscissa axis. On the abscissa axis, an input data value "0" corresponds to white, and an input data value "255" corresponds to black. A broken line 1400 in FIG. 21 indicates an ideal linear density characteristic. The density characteristic line 1400 indicates that if linear data is input, the density characteristic after printing out the input data becomes linear.

However, the output unit is subject to an influence of an environment and a frequency of use. Accordingly, the density characteristic of the output unit can vary as indicated by curves 1401, 1402, and 1403. In order to achieve a linear output density characteristic, it is necessary to correct density data using a gradation correction table.

FIG. 22 illustrates an example of a gradation correction table used for correcting the non-linearity of the density characteristic illustrated in FIG. 21.

In FIG. 22, ordinate and abscissa axes are similar to those in FIG. 21. A characteristic 1501 is used for correcting the density characteristic 1401. The characteristic 1401 and the characteristic 1501 are symmetrical with respect to a linear density characteristic broken line 1500.

A characteristic 1502 is used for correcting the density characteristic 1402. A characteristic 1503 is used for correcting the density characteristic 1403.

The gradation correction table includes values for the characteristics 1501, 1502, and 1503. Using the gradation correction table, output data can be linearly corrected.

Several conventional methods have been used for calculating density characteristics of an output image illustrated in FIG. 21. For example, a conventional gradation correction method corrects a gradation by performing a gamma correction using a two-dimensional gradation correction table generated for each of yellow (Y), magenta (M), cyan (C), and black (K) to obtain predetermined density characteristics, based on monochromatic gradation patches for colors of Y, M, C, and K printed output in a sample chart and read with a reading unit (reader).

A recent image forming apparatus includes a plurality of image processing methods and halftone processing methods. Thus, a density characteristic of an image digitized by an error distribution method differs from a density characteristic of an image digitized by a screen conversion or dithering. Accordingly, it is necessary to perform a density correction using the above-described gradation correction table for each halftone processing method.

Recent communication lines allow high-speed data communication and a large amount of data communication. In this regard, a method has been used for performing a copy operation, a send operation, or a facsimile transmission operation with network-connected apparatuses, such as a multifunction peripheral (MFP), a printer device, and a scanner device.

In such a method, a user can designate a printer device installed at a location distant from an installation location of a scanner device. Then, image data input by the scanner device can be output to the printer device. Thus, a copy operation can be performed via a network.

However, a conventional network copy method using network-connected apparatuses has the following problems.

For example, it is difficult for a user to recognize whether an appropriate output level can be achieved based on a matching status of color reproduction ranges of a scanner device for inputting image data and a printer device for outputting the input image data and to select a most appropriate printer device. In addition, it is difficult for a user to recognize which printer device has a most appropriate color matching status for a scanner device for inputting image data and to select a most appropriate printer device.

Furthermore, it is difficult for a user to determine whether the above-described gradation correction has been properly performed by the printer device for outputting the input image data.

Accordingly, contrary to a user's intention, the input image data may be output by an output device that has a low color matching status for an image input device, thus resulting in a print product having a low output quality.

SUMMARY OF THE INVENTION

The present invention is directed to an image processing apparatus and a data processing method configured to determine a degree of fit between an image data input device and an image data output device.

According to an aspect of the present invention, an image processing apparatus includes a connecting unit configured to connect the image processing apparatus to a network via which a plurality of image output devices can be connected to the image processing apparatus, an input unit configured to input image data, a specifying unit configured to specify an image processing attribute of the input unit, an acquiring unit configured to acquire information indicating a degree of fit between the image processing attribute of the input unit specified by the specifying unit and an image processing attribute of each of the plurality of image output devices, and a display unit configured to display a list of the plurality of image output devices with an indicator of the degree of fit based on the information acquired by the acquiring unit.

According to another aspect of the present invention, a server apparatus includes a management unit configured to manage an image processing attribute of each of a plurality of image output devices, an input unit configured to input an image processing attribute of an image input device, a determination unit configured to determine a degree of fit between the image processing attribute of each of the plurality of image output devices and the image processing attribute of the image input device based on the image processing attribute managed by the management unit and the image processing attribute input by the input unit, and an output unit configured to output the degree of fit determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 8 illustrates an example of a data structure of a database registered on a network device information management unit of the server illustrated in FIG. 7 according to the first exemplary embodiment of the present invention.

FIG. 11 is a flow chart illustrating an example of a data processing operation performed by the image processing system according to the first exemplary embodiment of the present invention.

FIG. 15 illustrates a memory map of a storage medium that stores various data processing programs that can be read by an image processing apparatus (MFP) and the server apparatus in the image processing system according to an exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention. For example, embodiments of the present invention may be implemented as disclosed in the various separate illustrations and supporting text or using combinations of the various illustrations and supporting text or components thereof, or in any of a wide variety of ways as will be apparent to those skilled in the art.

First Exemplary Embodiment

Figure 1:
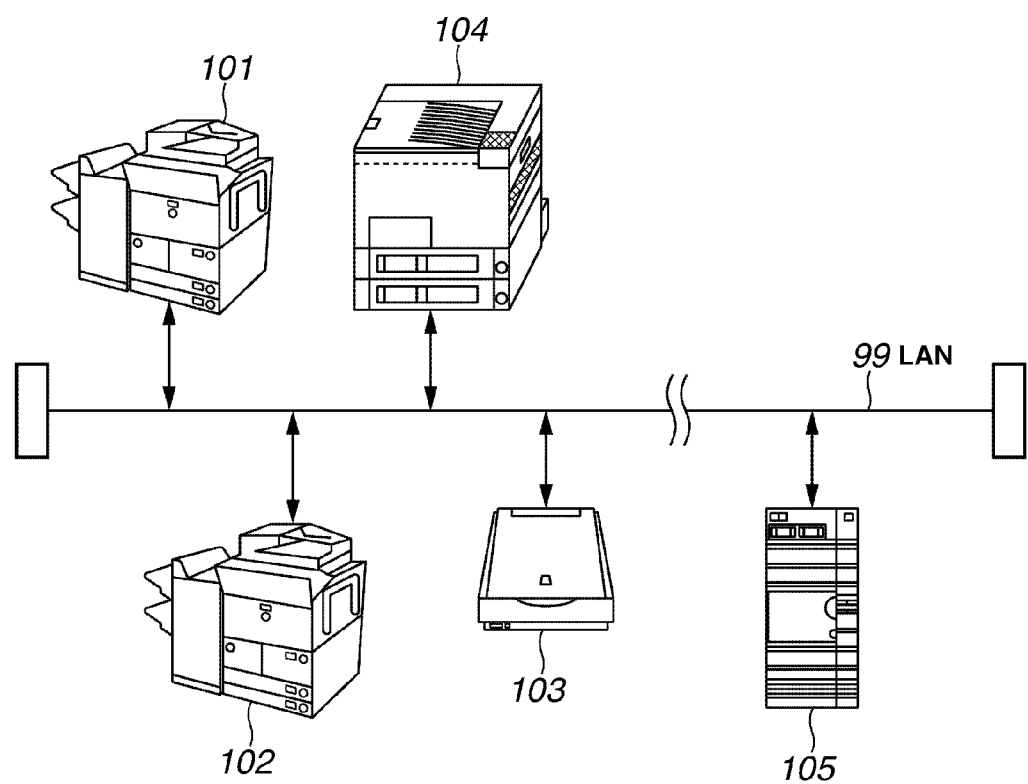
FIG. 1 illustrates an example of a configuration of an image processing system according to a first exemplary embodiment of the present invention.

Now, a first exemplary embodiment of the present invention will be described below. FIG. 1 illustrates an example of a configuration of an image processing system to which an image processing apparatus according to a first exemplary embodiment can be applied.

In the image processing system according to the present exemplary embodiment, an image processing apparatus can communicate with another image processing apparatus via a network. Thus, the image processing system according to the present exemplary embodiment can perform a job. For example, in the image processing system according to the present exemplary embodiment, an image processing apparatus sends image data input thereon by a user to another image processing apparatus on the network to output the image data on the output destination image processing apparatus, thereby implementing a copy operation.

Referring to FIG. 1, an image processing system according to the present exemplary embodiment includes input and output devices, including multi-function printers (MFPs) 101 and 102, a scanner 103, and a printer 104, which are in communication with one another via a local area network (LAN) 99. A server 105 is connected to the LAN 99 to perform data communication with the MFPs 101 and 102, the scanner 103, and the printer 104. The server 105 manages attribute information of each of the input and output devices.

The server 105 has a function for receiving a request for searching for an output device from an input device and sending a color matching status (CMS), which corresponds to a degree of fit calculated with degree-of-fit calculation processing and will be described in detail below, to the request source input device.

Each of the MFPs 101 and 102 includes an image data input unit. With the image data input unit, the MFP 101 and the MFP 102 can function as an input device. When a user has selected a function such as a network copy, the MFP 101 or the MFP 102 sends a request for searching for an output device issued by a user via an operation unit thereof to the server 105, together with an image processing attribute set and held in the image data input unit.

Figure 2:
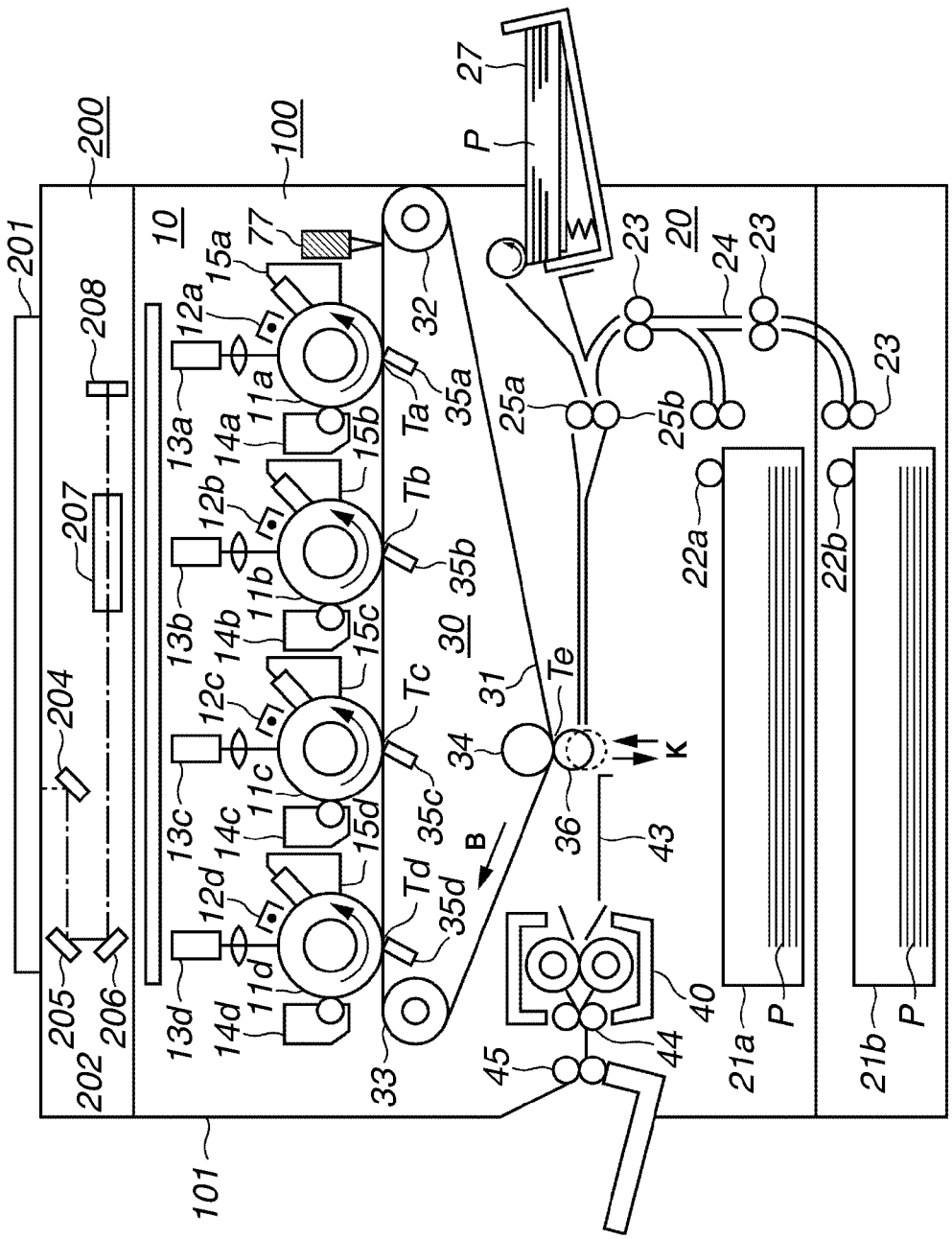
FIG. 2 illustrates an example of a configuration of an MFP included in the image processing system illustrated in FIG. 1 according to the first exemplary embodiment of the present invention.

FIG. 2 illustrates an example of a configuration of each of the MFP 101 and the MFP 102 included in the image processing system (FIG. 1) according to the present exemplary embodiment.

In the example illustrated in FIG. 2, the MFP 101 and the MFP 102 each include an image output unit and an image data input unit physically integrated with each other. However, the present invention is not limited to this. The MFP 101 and the MFP 102 each can include an image output unit and an image data input unit separately provided. A device having a single function, such as the scanner 103 or the printer 104, may be connected to the LAN 99. In the example illustrated in FIG. 2, the MFP 101 and the MFP 102 have the same or similar configuration. As an example, the configuration of the MFP 101 is described below.

Referring to FIG. 2, the MFP 101 includes an image data input unit 200. A platen glass 201 is a document positioning table. A reader 202 includes a document illumination lamp (not illustrated) and scanning mirrors 204, 205, and 206.

When image capturing processing starts, the scanning mirror 204 of the image data input unit 200 oscillates and scans the document in a predetermined direction. Then, reflection light from the document passes through a lens 207 via the scanning mirrors 204 through 206 to form an image on a charge-coupled device (CCD) sensor in an image sensor unit 208.

An auto document feeder (ADF) (not illustrated) or a pressure plate cover (not illustrated) is mounted on the image data input unit 200.

An image output unit 100 mainly includes an image forming unit 10, a paper feed unit 20, an intermediate transfer unit 30, a fixing unit 40, and a control unit (not illustrated). The image forming unit 10 includes four stations a, b, c, and d, each having a similar configuration.

Herein below, the configuration of each of the image forming unit 10, the paper feed unit 20, the intermediate transfer unit 30, the fixing unit 40, and the control unit will be described in detail below. The image forming unit 10 includes photosensitive drums (image bearing members) 11a, 11b, 11c, and 11d, each of which is supported by a shaft on a center axis thereof to be rotated in a direction indicated by an arrow in FIG. 2. Primary chargers 12a, 12b, 12c, and 12d, optical systems 13a, 13b, 13c, and 13d, and development units 14a, 14b, 14c, and 14d are respectively disposed facing an outer peripheral surface of each of the photosensitive drums 11a, 11b, 11c, and 11d in a direction of rotation of the photosensitive drums 11a, 11b, 11c, and 11d.

The primary chargers 12a, 12b, 12c, and 12d respectively charge the peripheral surfaces of photosensitive drums 11a, 11b, 11c, and 11d uniformly.

Then, optical systems 13a, 13b, 13c, and 13d each expose a respective light beam, such as a laser beam, which has been modulated according to a respective recording image signal, onto a respective peripheral surface of photosensitive drums 11a, 11b, 11c, and 11d. Thus, a respective electrostatic latent image is formed on the peripheral surface of each of the photosensitive drums 11a, 11b, 11c, and 11d.

The development units 14a, 14b, 14c, and 14d contain yellow, cyan, magenta, and black toners respectively, which temporarily adhere to the electrostatic latent images formed on the peripheral surfaces of photosensitive drums 11a, 11b, 11c, and 11d respectively.

Then, cleaning devices 15a, 15b, 15c, and 15d perform a cleaning of the surface of the photosensitive drums 11a, 11b, 11c, and 11d on a downstream side of image transfer areas Ta, Tb, Tc, and Td, at each of which a respective transferring unit 35a, 35b, 35c, 35d transfers the toner temporarily adhered to a latent image onto an intermediate transfer member 31 by applying holding the intermediate transfer member 31 against the peripheral surfaces of photosensitive drums 11a, 11b, 11c, and 11d respectively. More specifically, the cleaning devices 15a, 15b, 15c, and 15d wipe off the toner remaining on the photosensitive drums 11a, 11b, 11c, and 11d after a transfer of toners onto the intermediate transfer member 31, thereby cleaning any remaining toner from the peripheral surfaces of the photosensitive drums 11a, 11b, 11c, and 11d. In this embodiment, the intermediate transfer member is a belt that is supported by three rollers 32, 33, and 34.

Toner images corresponding to the four colors of yellow, cyan, magenta, and black are serially formed on the intermediate transfer 31 by the above-described processing.

The paper feed unit 20 includes cassettes 21a and 21b, a manual feed tray 27, pickup rollers 22a and 22b, paper feed roller pairs 23, a paper feed guide 24, and registration rollers 25a and 25b.

Recording materials P are stacked in the cassettes 21a and 21b. The recording materials P are fed sheet by sheet by the pickup rollers 22a and 22b. The recording material P, after being fed by the pickup rollers 22a and 22b is then conveyed to the registration rollers 25a and 25b by the paper feed roller pairs 23.

The recording material P, which has been guided by the paper feed guide 24 and conveyed to the registration rollers 25a and 25b, is then conveyed to a secondary transfer area Te in synchronization with a timing for forming an image by the image forming unit 10. At the secondary transfer area, the intermediate transfer member 31 and the recording material P are sandwiched together using roller 34 and a displaceable roller 36 thereby transferring the image to the recording material P. The recording material P is then guided by a guide plate 43 into the fixing unit 40.

The control unit includes a control substrate (not illustrated) for controlling an operation of each mechanism of the above-described units and a motor drive substrate (not illustrated). For example, the displaceable roller 36 can be moved away from roller 34 to allow the recording material P to pass through MFP without an image being disposed thereon and moved toward roller 34 to transfer images.

The fixing unit 40 fixes the transferred image on the recording material P, conveyed to the secondary transfer area Te by the intermediate transfer member 31, by applying heat and pressure there between using roller pair 44. The recording material P having the fixed image is discharged to the outside of the MFP 101 by a discharge roller 45. A cleaning unit 77 cleans any remaining toner off the intermediate transfer member 31 downstream of the secondary transfer area Te. Then, the image forming operation ends.

Figure 3:
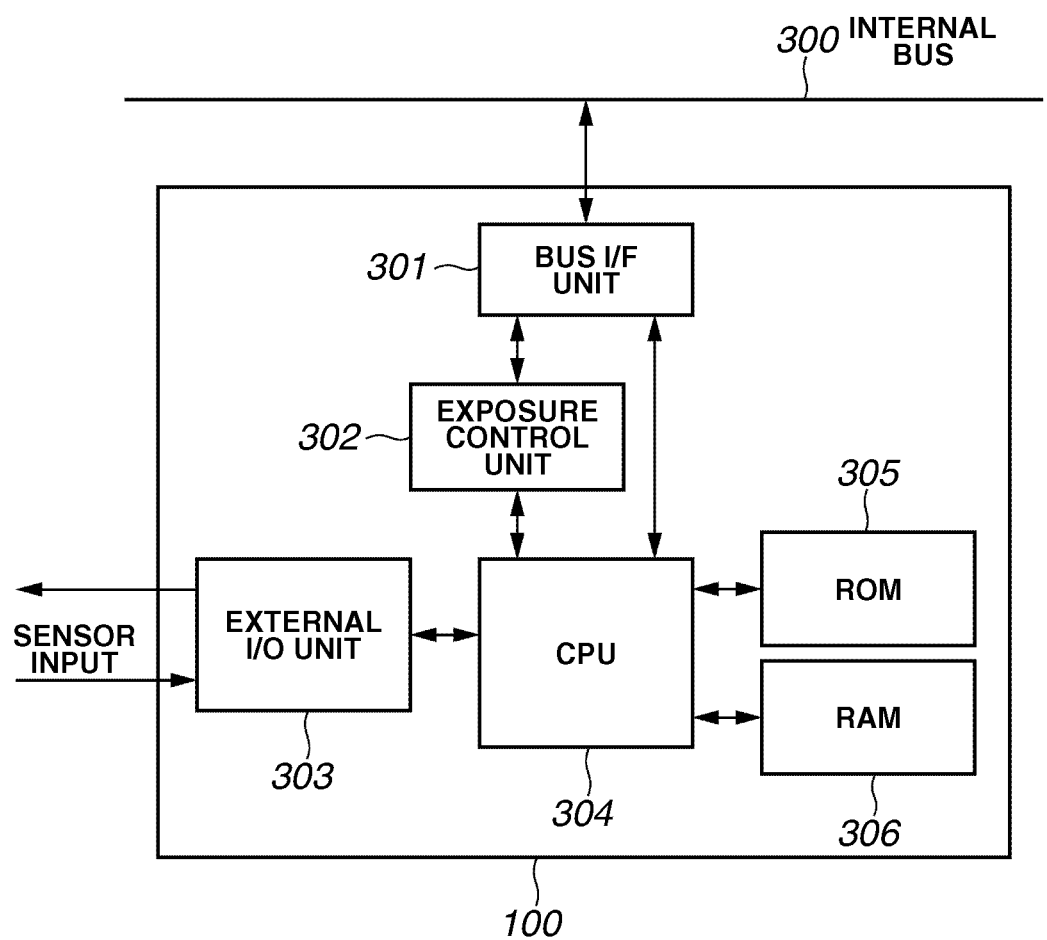
FIG. 3 illustrates an example of a control configuration of an image output unit illustrated in FIG. 2 according to the first exemplary embodiment of the present invention.

FIG. 3 illustrates an example of a control configuration of the image output unit 100 (FIG. 2) of the MFP 101 according to the present exemplary embodiment.

Referring to FIG. 3, the image output unit 100 includes a bus interface (I/F) unit 301, an exposure control unit 302, a read-only memory (ROM) 305, and a random access memory (RAM) (non-volatile memory) 306, which are electrically connected to a central processing unit (CPU) 304. In addition, an external input/output (I/O) unit 303 is connected to the CPU 304 via an address bus and a data bus.

The bus I/F unit 301 is an interface between the image output unit 100 and the image data input unit 200. The image output unit 100 can send and receive a control command to and from the image data input unit 200 and receive image data from the image data input unit 200 via an internal (system) bus 300.

The CPU 304 controls the image output unit 100. The CPU 304 reads and executes a basic input/output (I/O) program (control program) stored in the ROM 305 and loaded on the RAM 306.

The CPU 304 controls the bus I/F unit 301 and the exposure control unit 302 based on the control program stored in the ROM 305. Under the control of the CPU 304, the exposure control unit 302 performs an exposure control operation on image data received via the bus I/F unit 301 for each line, as image data to be formed on the photosensitive drums 11a, 11b, 11c, and 11d.

Various loads, such as a motor and a clutch (not illustrated), and inputs (not illustrated), such as a sensor for detecting a position of a sheet of paper (recording material) for controlling the image output unit 100 are connected to the external I/O unit 303.

The CPU 304, as described above, reads and executes the control program stored in the ROM 305 and loaded on the non-volatile RAM 306 to serially perform a control operation of input and output of image data via the external I/O unit 303 and the exposure control unit 302. Thus, an image forming operation can be implemented with the CPU 304.

Figure 4:
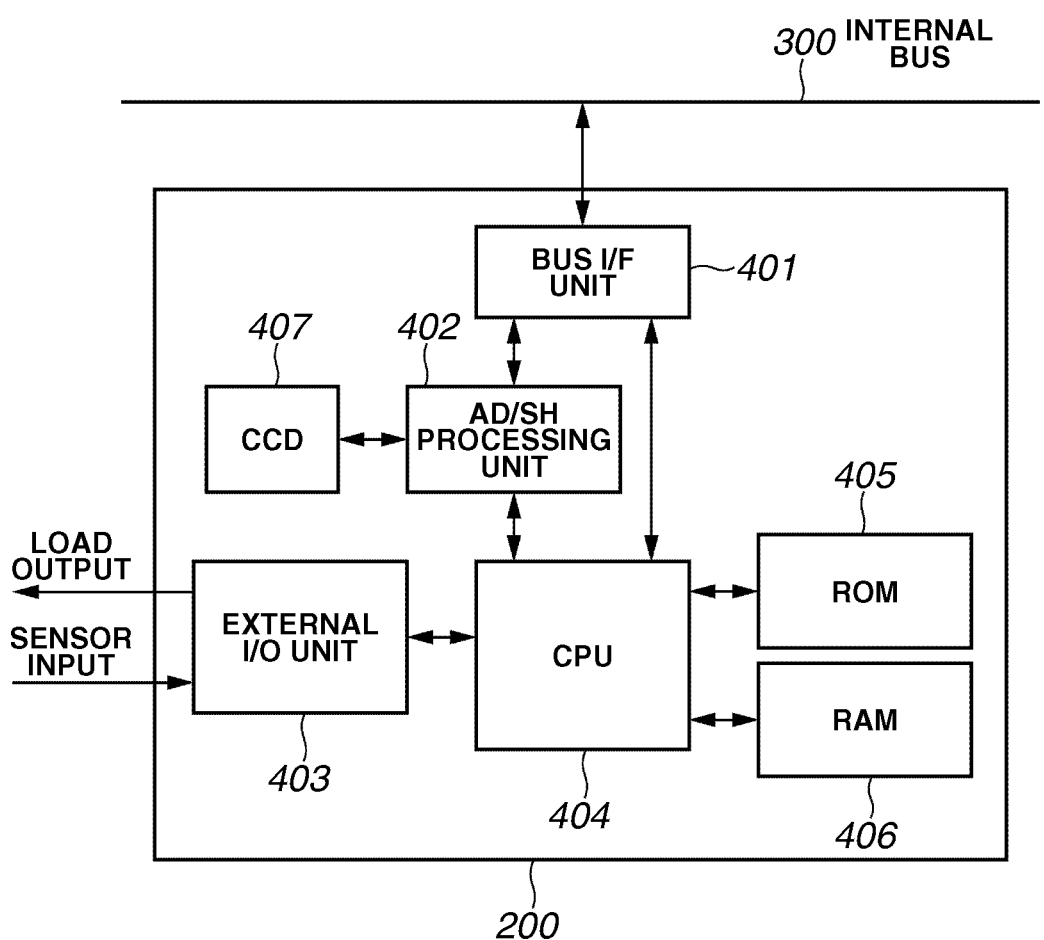
FIG. 4 illustrates an example of a hardware configuration of an image data input unit illustrated in FIG. 2 according to the first exemplary embodiment of the present invention.

FIG. 4 illustrates an example of a hardware configuration of the image data input unit 200 (FIG. 2) of the MFP 101 according to an exemplary embodiment.

Referring to FIG. 4, the image data input unit 200 includes a bus I/F unit 401, an analog-to-digital (A/D) conversion and sample-holding (SH) processing unit 402, a ROM 405, and a non-volatile RAM 406, which are electrically connected to a central processing unit (CPU) 404. In addition, an external input/output (I/O) unit 403 is connected to the CPU 404 via an address bus and a data bus.

The bus I/F unit 401 is an interface between the image output unit 100 and the image data input unit 200. The image data input unit 200 can send and receive a control command to and from the image output unit 100 and send image data to the image output unit 100 via the internal (system) bus 300.

The CPU 404 controls the image data input unit 200. The CPU 404 reads and executes a basic input/output (I/O) program (control program) stored in the ROM 405 and loaded on the RAM 406.

A CCD 407, of the image sensor unit 208, is connected to the analog-to-digital (A/D) conversion and sample-holding (SH) processing unit 402 and converts an image of a document optically read with the reader 202 into an analog electrical signal for each line.

The A/D conversion and SH processing unit 402 inputs image information converted by the CCD 407 to an analog signal processing unit (not illustrated), performs sample-holding processing and a dark level correction thereon, and then performs an A/D conversion on the corrected analog signal.

In addition, the A/D conversion and SH processing unit 402 performs a shading correction (a correction on unevenness in the sensors that read the document and a correction on a light distribution characteristic of the document lighting lamp (not illustrated)) on the digitized signal. Then, the CPU 404 sends the image data for each line to the image output unit 100 via the bus I/F unit 401 and the internal bus 300.

Various loads, such as a motor and a lamp (not illustrated), and inputs (not illustrated), such as a sensor for detecting a position of the reader 202 for controlling the image data input unit 200, are connected to the external I/O unit 403.

The CPU 404, as described above, reads and executes the control program stored in the ROM 405 and loaded on the non-volatile RAM 406 to serially perform a control operation of input and output of image data via the external I/O unit 403, the CCD 407, and the A/D conversion and SH processing unit 402. Thus, an image data input operation can be implemented with the CPU 404.

Figure 5:
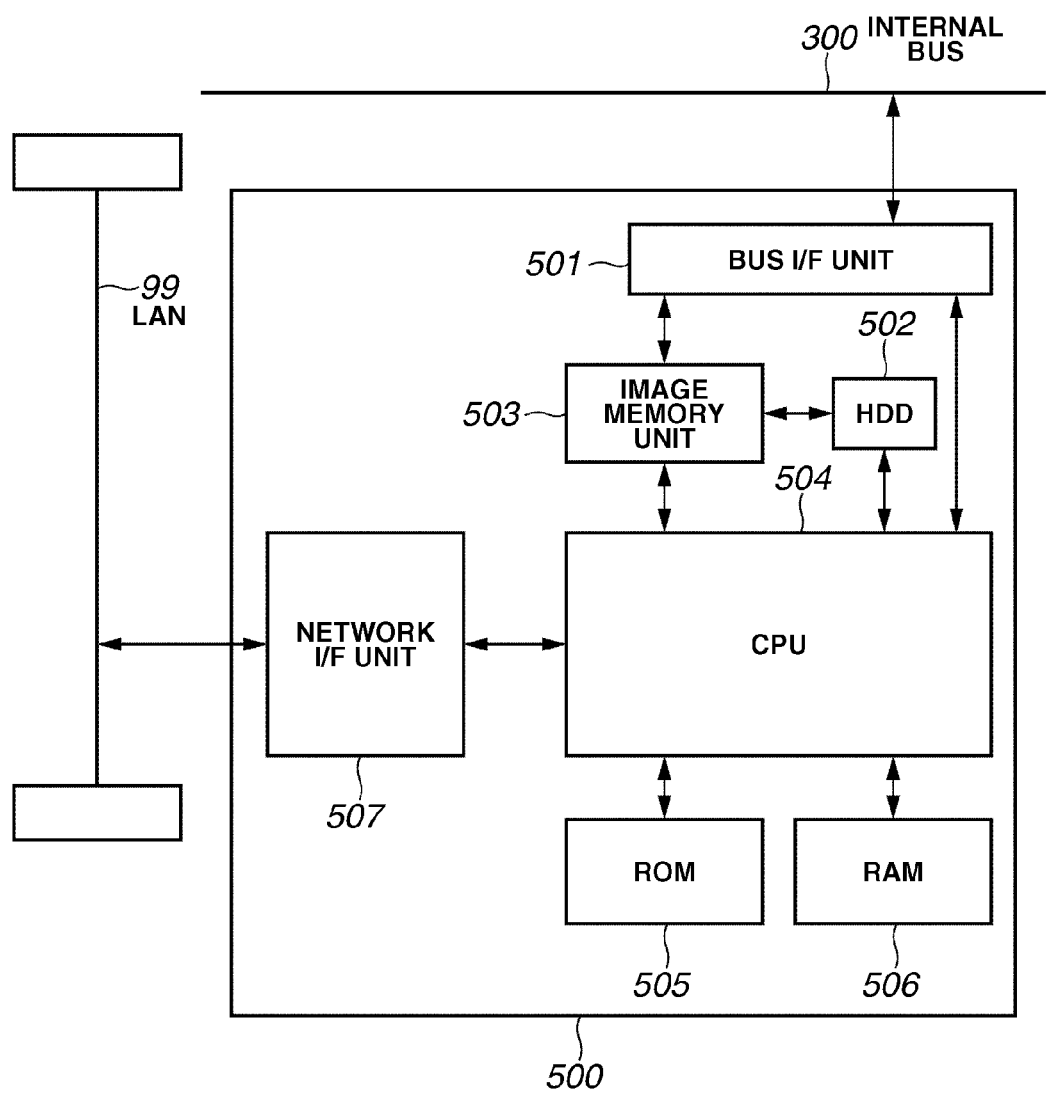
FIG. 5 illustrates an example of a hardware configuration of a controller unit of the MFP illustrated in FIG. 1 according to the first exemplary embodiment of the present invention.

FIG. 5 illustrates an example of a hardware configuration of a controller unit 500 of each of the MFP 101 (FIG. 1) and the MFP 102 (FIG. 1) according to an exemplary embodiment.

The controller unit 500 controls the image output unit 100, the image data input unit 200, and an operation unit 600 (described in detail below) via the internal bus 300. The controller unit 500 can be implemented as an application program installed on a general purpose computer (personal computer (PC)). Furthermore, the controller unit 500 can be implemented as software installed on a PC. Moreover, the controller unit 500 can be implemented by dedicated hardware.

Referring to FIG. 5, the controller unit 500 includes a bus I/F unit 501, an hard disk drive (HDD) 502, an image memory unit 503, a ROM 505, a non-volatile RAM 506, and a network I/F unit 507, which are electrically connected to a CPU 504.

The network I/F unit 507 is an interface between the controller unit 500 and an external network. The network I/F unit 507 sends and receives a control command and image data to and from a device, such as an MFP, a printer, or a scanner, via the external network.

The bus I/F unit 501 is an interface between the controller unit 500 and each of the image output unit 100, the image data input unit 200, and the operation unit 600. The controller unit 500 can send and receive a control command to and from each of the image output unit 100, the image data input unit 200, and the operation unit 600 and receive image data from the image output unit 100 and the image data input unit 200.

The CPU 504 controls the controller unit 500. The CPU 504 reads and executes a basic input/output (I/O) program (control program) stored on the HDD 502 and loaded on the RAM 506.

Now, an internal operation of the controller unit 500 will be described below for locally performing a copy operation, within the MFP 101 or the MFP 102, using the image data input unit 200 and the image output unit 100 (without using the network I/F unit 507).

When a user issues an instruction for performing a copy operation via the operation unit 600, the CPU 504 serially stores, on the HDD 502, contents of the settings performed by the user for an image forming mode based on data input via keys of the operation unit 600, which have been received via the bus I/F unit 501. At the same time, the bus I/F unit 501 sends data to be displayed next on a screen of the operation unit 600 to the operation unit 600.

After the above-described processing is repeated an appropriate number of times, when the user presses a start key displayed on the screen of the operation unit 600, the CPU 504 receives an input of data performed by the user via the start key of the operation unit 600. Then, the CPU 504 starts sending a control command to the image data input unit 200 according to the setting previously performed for the image forming mode.

The image data input unit 200 sends image data based on the received control command. Then, the CPU 504 of the controller unit 500 receives the image data via the bus I/F unit 501. Then, the CPU 504 loads the image data for each page on the image memory unit 503.

The page image data loaded on the image memory unit 503 is then subjected to image processing including image magnification processing and color correction processing under the control of the CPU 504. Subsequently, the CPU 504 loads the image-processed page image data on the image memory unit 503 again. Then, the CPU 504 stores the page image data on the HDD 502.

According to the image forming mode designated by the user, the CPU 504 sends a preprocessing command to the image output unit 100 via the bus I/F unit 501 at the same time as storing the page image data on the HDD 502.

Then, the CPU 504 sends the image data to the image output unit 100 via the bus I/F unit 501 to perform the image forming operation with the image output unit 100, which has already performed a preparation operation for the image forming processing. Subsequently, the controller unit 500 repeats the above-described series of processing a number of times according to the number of sheets of the document set on the image data input unit 200 and the image forming mode set by the user.

Then, if the image forming mode set by the user is a mode for outputting a plurality of copies, the CPU 504 serially reads the page image data stored on the HDD 502, then loads the read page image data on the image memory unit 503, and then sends the page image data to the image output unit 100 via the bus I/F unit 501 to print the page image data with the image output unit 100.

With the above-described processing, an electronic sorting function can be provided for outputting the image data for each copy without using a sorting apparatus (sorter) by outputting a plurality of document images a plurality of times in a descending or ascending order of input.

The CPU 504 sends to the operation unit 600 data to be displayed on the screen of the operation unit 600 so that the operation unit 600 can display information about a status of progress of the image data input operation and the image forming operation.

In the present exemplary embodiment, in the case of performing a network copy operation for outputting image data read with the image data input unit 200 of the MFP 101 (or the MFP 102) to the image output unit 100 of the MFP 102 (or the MFP 101) via the LAN 99, the network copy operation is performed as follows.

The image data input by the MFP 101 (or the MFP 102) or the scanner 103 is input to the network I/F unit 507 in the controller unit 500 of the MFP 102 (or the MFP 101) or the printer 104. Then, the image output unit 100 of the MFP 101 (or the MFP 102) or the printer performs the above-described processing for outputting the image data. Thus, the network copy operation can be performed.

Figure 6:
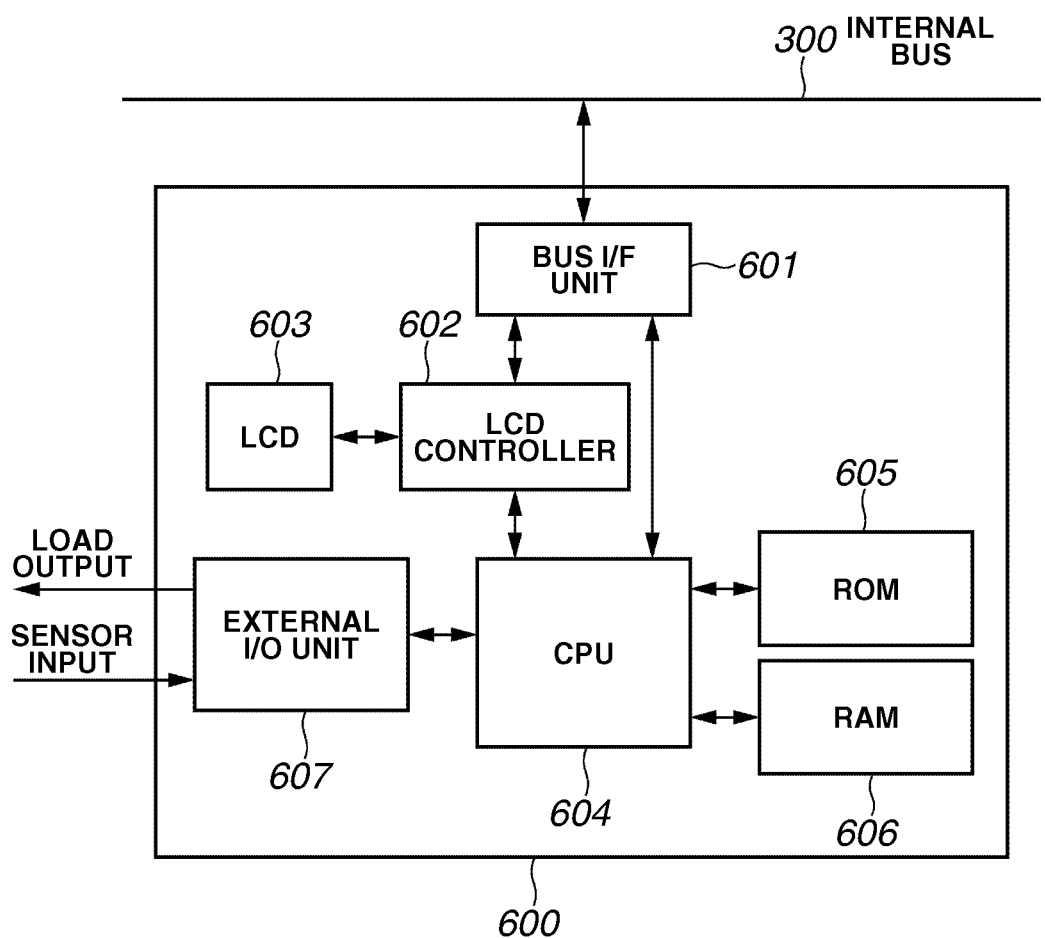
FIG. 6 illustrates an example of a configuration of an operation unit in the image data input unit illustrated in FIG. 2 according to the first exemplary embodiment of the present invention.

FIG. 6 illustrates an example of a configuration of the operation unit 600 in the image data input unit 200 (FIG. 2) according to an exemplary embodiment.

Referring to FIG. 6, the operation unit 600 includes a bus I/F unit 601, a liquid crystal display (LCD) controller 602, a ROM 605, and a non-volatile RAM 606, which are electrically connected to a CPU 604. In addition, an external I/O unit 607 is connected to the CPU 604 via an address bus and a data bus.

The bus I/F unit 601 is an interface between the operation unit 600 and the controller unit 500. The operation unit 600 can send key input data to the controller unit 500 and receive light-emitting diode (LED) on/off status data and the data to be displayed on the LCD from the controller unit 500 via the internal bus 300.

The CPU 604 controls the operation unit 600. The CPU 604 reads and executes a basic input/output (I/O) program (control program) stored in the ROM 605 and loaded on the RAM 606.

The LCD controller 602 displays on an LCD 603 data received from the controller unit 500 via the bus I/F unit 601 under the control of the CPU 604.

Figure 7:
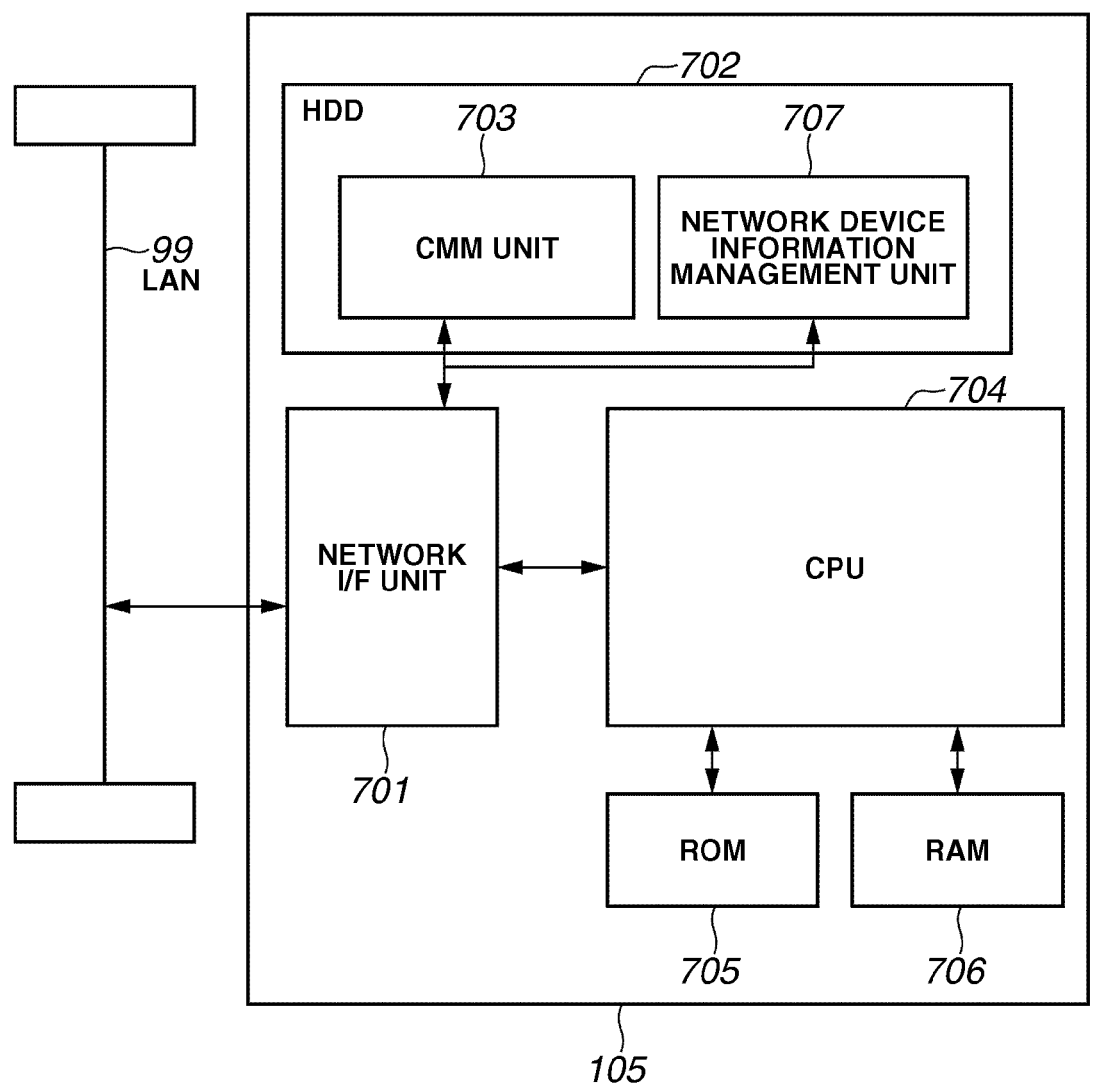
FIG. 7 illustrates an example of a configuration of a server apparatus illustrated in FIG. 1 according to the first exemplary embodiment of the present invention.

FIG. 7 illustrates an example of a configuration of the server 105 (FIG. 1) according to an exemplary embodiment.

Referring to FIG. 7, the server 105 includes a network I/F unit 701, an HDD 702, a color management module (CMM) unit 703, a ROM 705, a RAM 706, and a network device information management unit 707, which are electrically connected to a CPU 704. The server 105 is connected to the LAN 99 via the network I/F unit 701. The CPU 704 interprets a command sent from the MFP 101 or the MFP 102 via the LAN 99.

The server 105 performs a control operation for reading and writing data from and in a database held in the network device information management unit 707, inputs and outputs data held in the CMM unit 703, and converts the data into command data with the CPU 704. The CPU 704 sends the data to the MFP 101 or the MFP 102 via the network I/F unit 701 and the LAN 99.

The CPU 704 controls the server 105. More specifically, the CPU 704 reads and executes a basic input/output (I/O) program (control program) stored in the ROM 705 and loaded on the RAM 706 and temporarily stores in the RAM 706 numerical values necessary for performing the basic control of the server 105. The network device information management unit 707 manages attribute information on each of a plurality of output devices.

When the user has issued a request via the operation unit 600 of the input device for executing a cooperative function such as the network copy operation, in which the input device and the output device on the network operate in cooperation with each other, the server 105 receives an image processing attribute (a color reproduction range profile and gradation correction history information) of the input device.

The server 105, as will be described in more detail below, calculates a degree of fit of output devices that can be selected via the input device, based on the received image processing attribute of the input device. Then, the server 105 performs processing for sending to the input device the calculated degree of fit (a degree-of-fit indicator 1025 in FIG. 10C) of the output devices that can be selected via the input device and the attribute information on each of the output devices.

The CMM unit 703 of the server 105 calculates the degree of fit based on the image processing attribute of the input device received from the input device and the image processing attribute of each output device.

FIG. 8 illustrates an example of a data structure of a database 800 registered on the network device information management unit 707 of the server 105 (FIG. 7) according to an exemplary embodiment.

Referring to FIG. 8, data in each row describes data about a device. Data in each row includes a device name 801, device installation area information 802, and a device network address (Internet protocol (IP) address) 803.

Data in each row further includes attributes 804 describing information about whether the device supports a function such as a color print function, a two-sided print function, and a stapling function, a color reproduction range profile 805, and a gradation correction history 806.

A user can access the network device information management unit 707 of the server 105 via the MFP 101 or the MFP 102 to refer to data about the devices connected to the LAN 99 stored in the database 800. The data about the devices is used as a search condition for searching for an output device.

Figure 9:
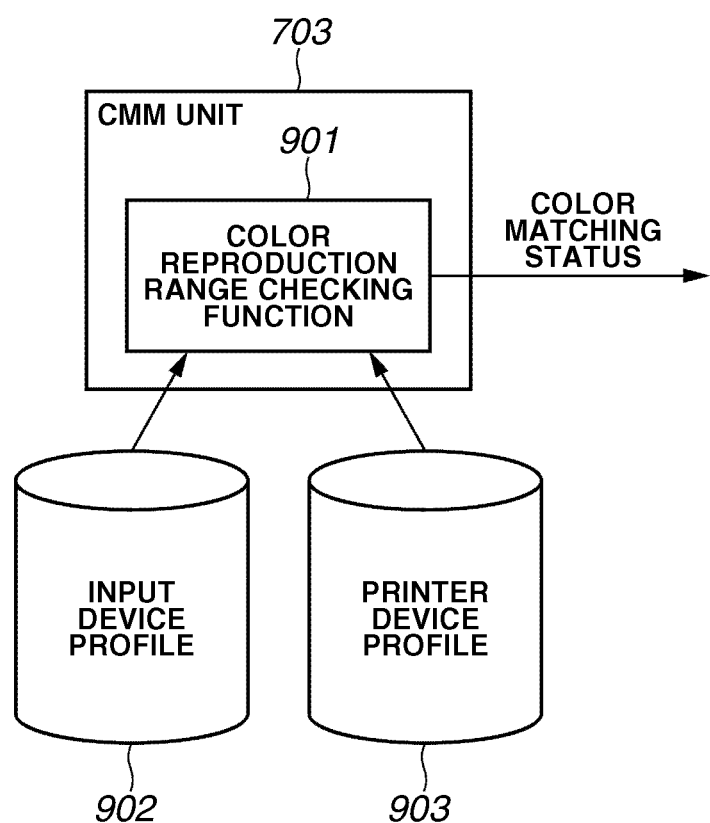
FIG. 9 illustrates an example of a configuration of a CMM unit of the server illustrated in FIG. 7 according to the first exemplary embodiment of the present invention.

FIG. 9 illustrates an example of a configuration of the CMM unit 703 of the server 105 illustrated in FIG. 7 according to an exemplary embodiment.

Referring to FIG. 9, the CMM unit 703 compares the color reproduction range information about each device based on profile information (image processing attribute) about the output devices and the input device on the network, and outputs a color matching status (CMS) based on a result of the comparison.

Figure 17:
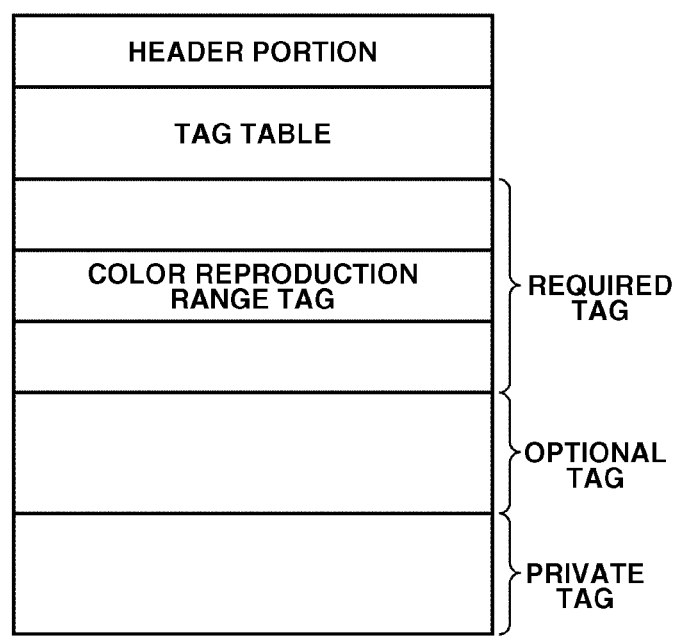
FIG. 17 illustrates a structure of a profile of an image output device.
Figure 18:
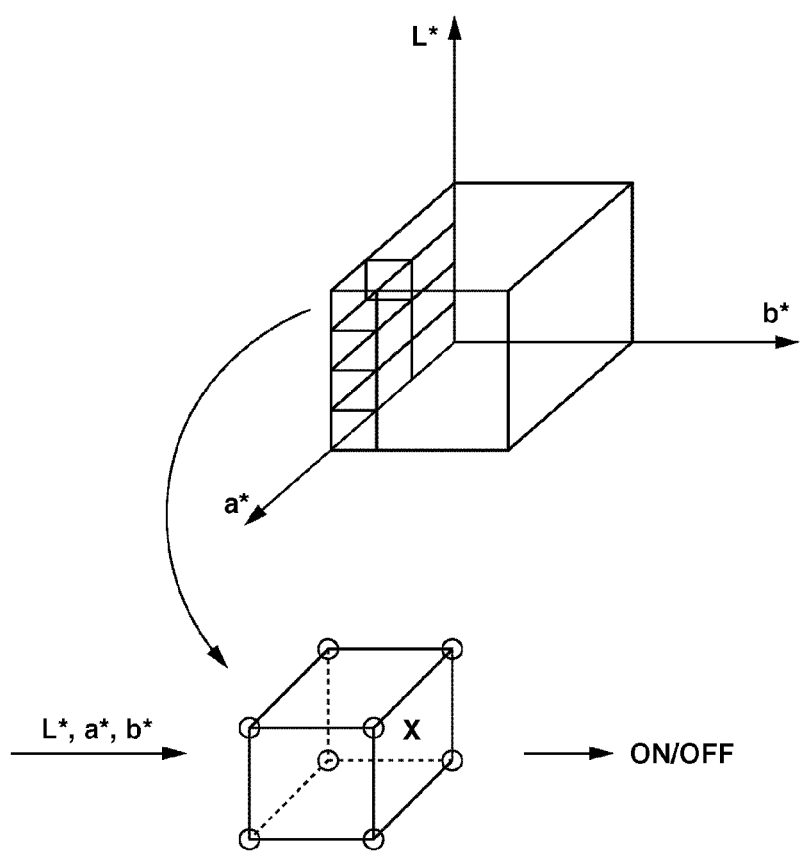
FIG. 18 illustrates a data structure of a color reproduction range tag illustrated in FIG. 17.
Figure 19:
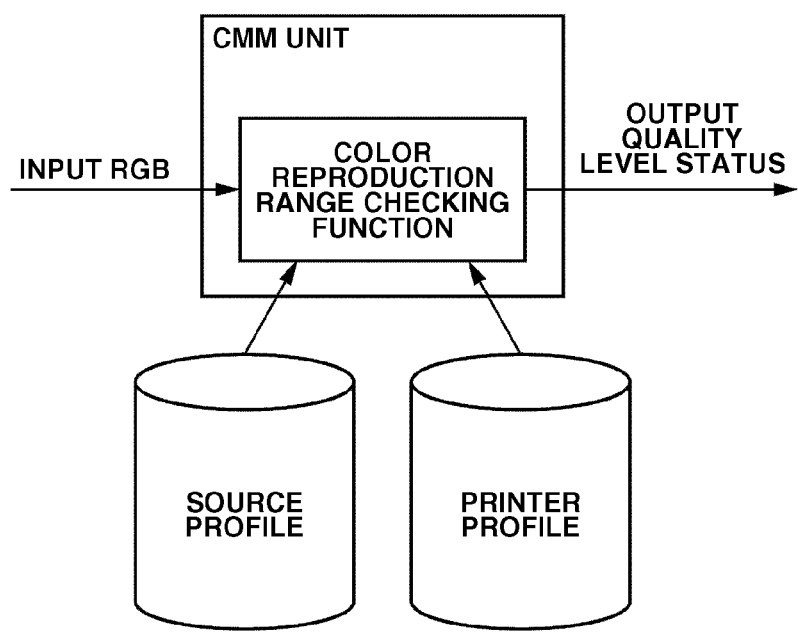
FIG. 19 illustrates a color reproduction range checking function of the CMM.
Figure 20:
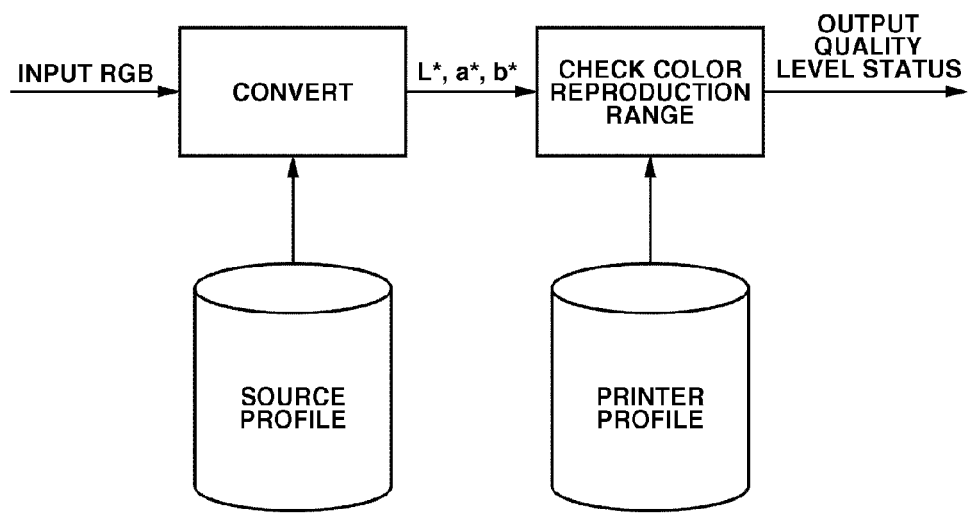
FIG. 20 illustrates an example of processing performed with the color reproduction range checking function illustrated in FIG. 19.
Figure 21:
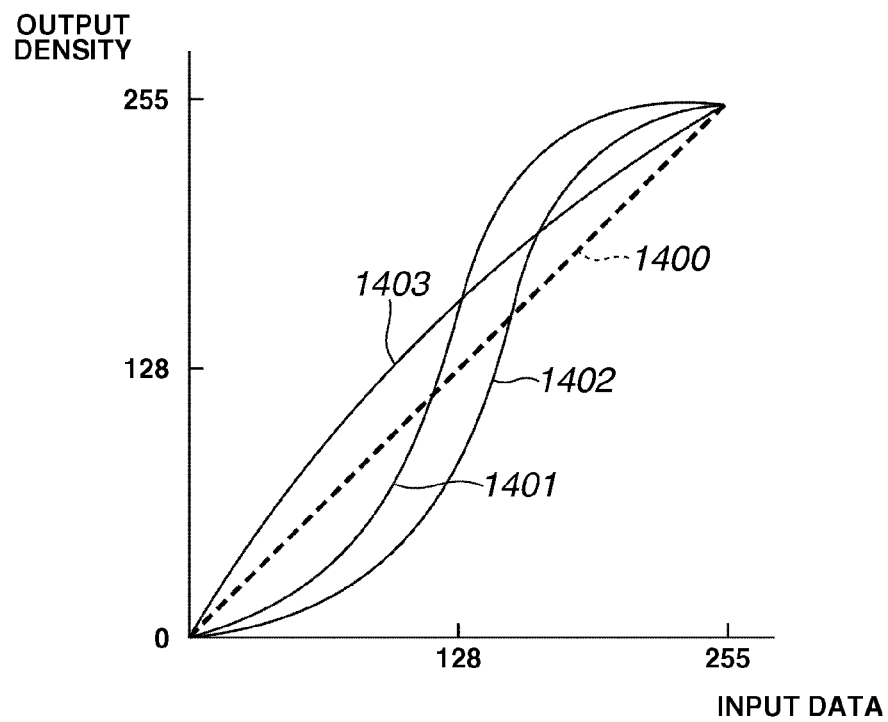
FIG. 21 illustrates a density characteristic of an output unit of an image forming apparatus.
Figure 22:
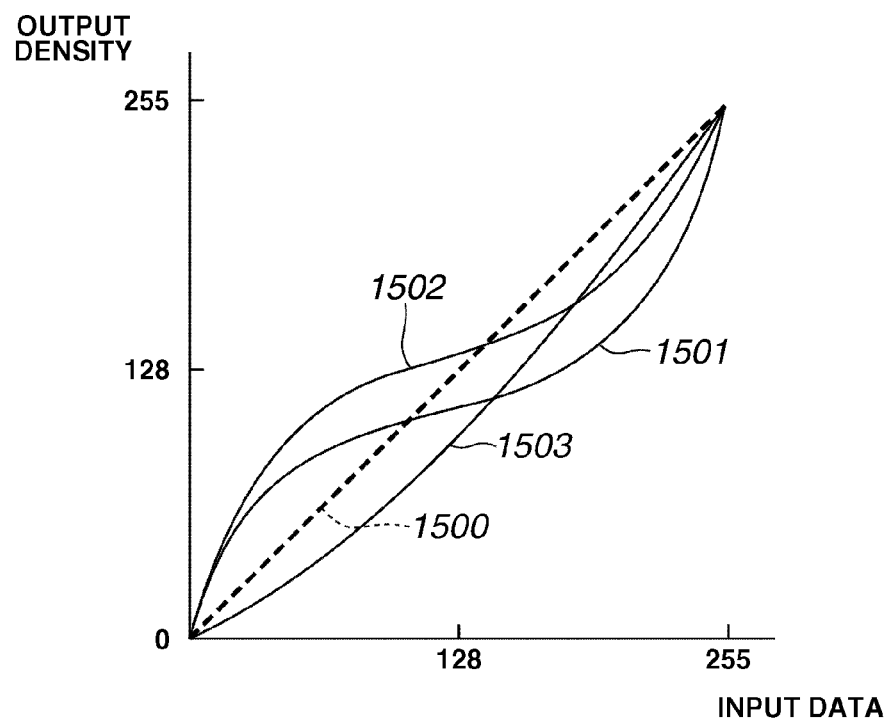
FIG. 22 illustrates an example of a gradation correction table used for correcting a linearity of the density characteristic illustrated in FIG. 21.

Here, the image processing attribute is information for identifying a color reproduction space range, which is described in detail above with reference to FIGS. 17 and 18.

As illustrated in FIG. 9, an input device profile 902 and a printer device profile 903 are supplied to a color reproduction range checking function 901.

The CMM unit 703 calculates a color matching level of the input device and the printer device based on the color reproduction ranges of the input device and the printer device using the color reproduction range checking function 901, and sends a result of the calculation as a CMS to the controller unit 500 of the MFP 101.

Now, processing for performing a network copy using the MFP 101 and the MFP 102 (FIG. 1) according to an exemplary embodiment will be described below with reference to FIGS. 10A through 10C. The user places a document on the ADF of the image data input unit 200 of the MFP 101, and then performs a setting for the network copy via the operation unit 600.

Figure 10A:
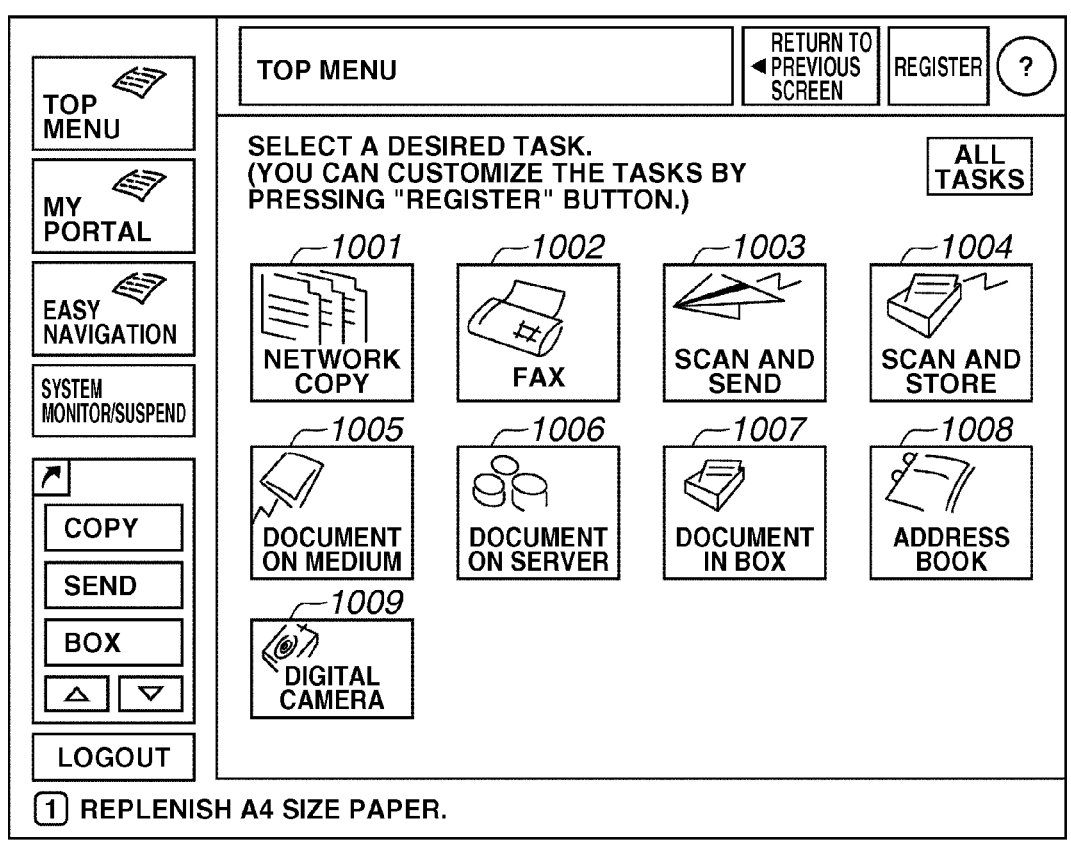
FIGS. 10A through 10C each illustrate a respective example of an operation screen displayed on the operation unit illustrated in FIG. 6 according to the first exemplary embodiment of the present invention.
Figure 10B:
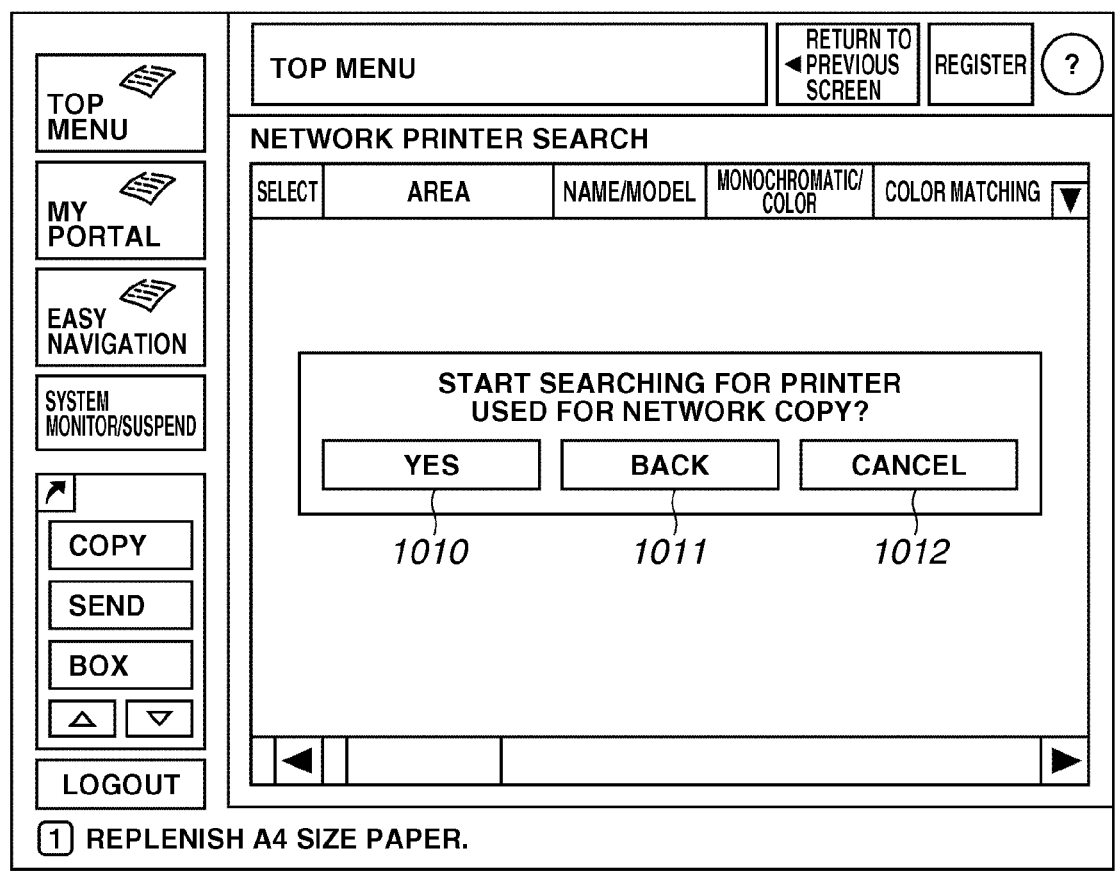
Figure 10C:
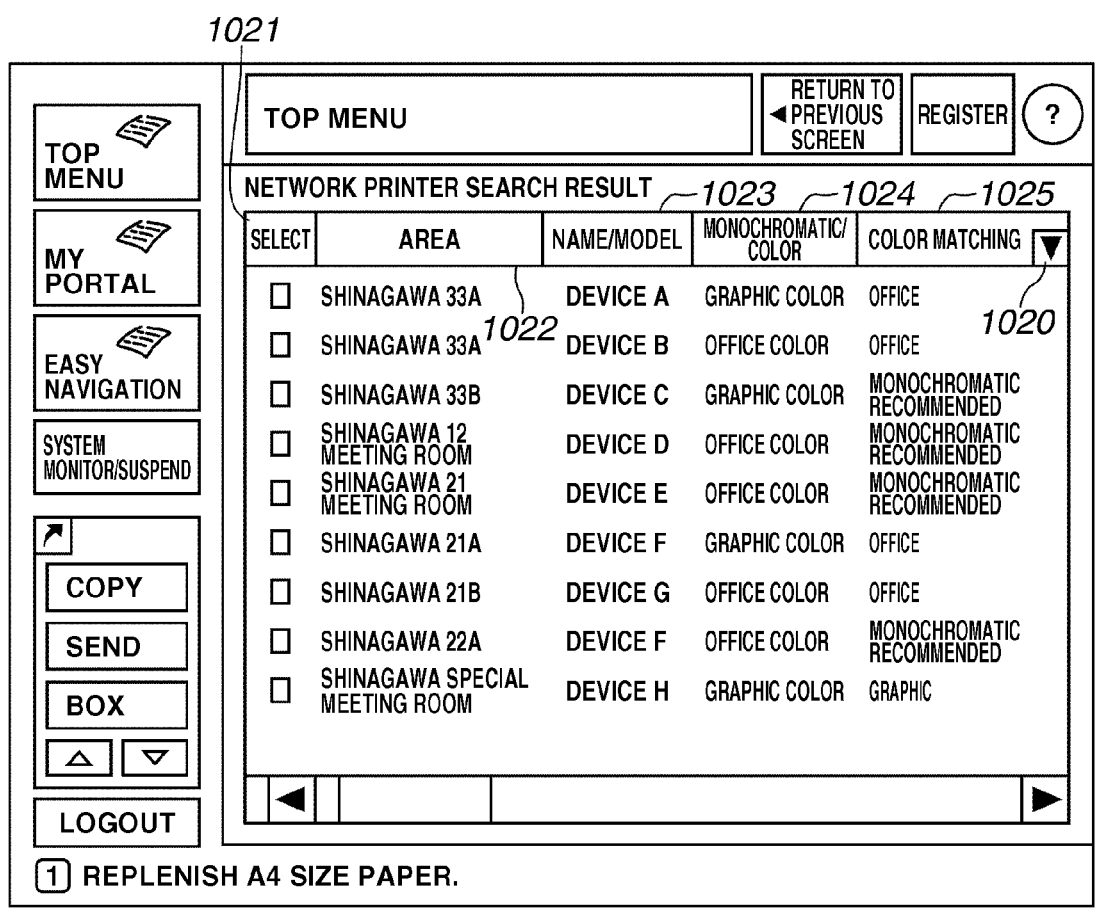

FIGS. 10A through 10C each illustrate an example of an operation screen displayed on the operation unit 600 (FIG. 6) according to an exemplary embodiment.

Referring to FIG. 10A, the user presses a "network copy" button (NCB) 1001 on the operation screen. Then, the CPU 604 changes the screen to a screen illustrated in FIG. 10B, via which the user can search for and select an output device for outputting an image of a document from among the MFPs and the printers on the network.

When the user presses a "YES" button 1010 on the screen for searching for a network printer, the CPU 504 of the controller unit 500 of the MFP (the MFP 101 or the MFP 102) starts searching for an output device on the network.

In the example illustrated in FIG. 10A, a "facsimile" button 1002 can be operated by a user to issue an instruction for performing a facsimile transmission job. A "scan and send" button 1003 can be operated by a user to issue an instruction for performing a send job for sending a scanned document via the network. A "scan and store" button 1004 can be operated by a user to issue an instruction for performing a job for storing a scanned document in the server 105.

A "document on medium" button 1005 can be operated by a user to issue an instruction for scanning a document in which a predetermined instruction is embedded and performing processing based on a content of the embedded instruction. A "document on server" button 1006 can be operated by a user to issue an instruction for reading a document stored in the server 105.

A "document in box" button 1007 can be operated by a user to issue an instruction for reading a document stored in a box (specific area on the HDD 502 of the MFP 101). An "address book" button 1008 can be operated by a user to issue an instruction for calling an address book storing addresses used for the facsimile transmission function and the scan and send function.

A "digital camera" button 1009 can be operated by a user to issue an instruction for reading image data from a digital camera connected to the MFP 101.

In the example illustrated in FIG. 10B, a "back" button 1011 can be operated by a user to issue an instruction for changing the current screen to the screen illustrated in FIG. 10A. A "cancel" button 1012 can be operated by a user to issue an instruction for canceling the setting.

FIG. 10C illustrates an example of a screen for displaying a result of the search for a network printer started based on the user instruction performed via the "YES" button 1010 (FIG. 10B) according to an exemplary embodiment.

Referring to FIG. 10C, a sort button 1020 can be operated by a user to issue an instruction for sorting the candidate output devices in descending order of the degree of fit. A "selection" field 1021 can be checked by a user for selecting an output device for performing printing by the network copy.

An "area" field 1022 indicates location (area) information about the extracted candidate output devices. The area information in the area field 1022 can be described with a character string or abbreviated code.

A "device name" field 1023 indicates a device name of the extracted candidate output device. A monochromatic/color attribute field 1024 indicates information about whether each of the extracted candidate output devices supports color printing.

In the example illustrated in FIG. 10C, a description "graphic color" in the monochromatic/color attribute field 1024 indicates that the corresponding output device (in the example in FIG. 10C, a "device A") can perform the network copy with a high image quality and at a relatively low print speed. A description "office color" in the monochromatic/color attribute field 1024 indicates that the corresponding output device (in the example in FIG. 10C, a "device B") can perform the network copy with an image quality lower than that in the graphic color mode and at a relatively high print speed. A description "monochromatic" (not illustrated) in the monochromatic/color attribute field 1024 indicates that the corresponding output device does not have a color print function and thus can perform the network copy only in a monochromatic print mode.

A "color matching" field 1025 indicates a degree-of-fit indicator generated based on the degree of fit between the input device and each of the candidate output devices.

In the example illustrated in FIG. 10C, the "color matching" field 1025 indicates a degree-of-fit indicator generated based on the CMS of each of the candidate output devices calculated with the function processing by the server 105.

Here, the degree-of-fit indicator is a level of the degree of fit. In the present exemplary embodiment, the degree-of-fit level can be indicated by information based on output specifications, numerical values, or graphics.

Here, the information based on output specifications refers to information described by a character string corresponding to a specification, such as "graphic", "office", or "monochromatic recommended". The description "graphic" indicates that the printing can be performed with a high image quality. The description "office" indicates that the image quality of the printing by the corresponding output device is lower than that of the output device having the output specification "graphic". The description "monochromatic recommended" indicates that a high image quality in the case of a color printing by the corresponding output device cannot be secured and thus it is recommended that the printing by the corresponding output device be performed in a monochromatic print mode. In the present exemplary embodiment, the degree-of-fit indicator can be indicated by the above-described three scales.

In the example illustrated in FIG. 10C, the device A has a monochromatic/color attribute "graphic color", but the degree-of-fit indicator for the device A is "office". This is because the image processing attribute of the input device greatly differs from the image processing attribute of the output device (device A), and accordingly, the high image quality in the graphic color mode cannot be secured. Thus, the degree-of-fit indicator for the device A is indicated as "office".

In the case where the network copy function has been designated by the user and it is designated by the user to output color information with a color printer, of the candidate output devices, if a sufficient level of color reproduction cannot be secured, then the user is recommended to perform the network copy in the monochromatic print mode.

Accordingly, it can be prevented that a sufficient color gradation of the color image quality of the resulting print product cannot be obtained. Thus, it can be prevented that a print product having an image quality that the user does not desire is obtained.

In the present exemplary embodiment, the input device that the user designates to perform a search for an output device via the operation unit 600 is a reader that performs a reading operation in a color reading mode. Accordingly, in the present exemplary embodiment, the monochromatic/color attribute and the degree-of-fit indicator include those for a color output.

In the case where the input device is a reader that performs a reading operation only in a monochromatic reading mode or where it has been designated by the user via the operation unit 600 that an input device having a color reading function performs a reading operation in a monochromatic reading mode, the degree-of-fit indicator can be omitted from the display screen, and only the monochromatic/color attribute information as to whether to perform a print operation with a monochromatic printer or a color printer can be displayed.

The display content in FIG. 10C can be displayed regardless of whether the input device performs a color reading operation or a monochromatic reading operation.

Now, a flow of processing according to the present exemplary embodiment will be described below with reference to a flow chart of FIG. 11.

FIG. 11 is a flow chart illustrating an example of a data processing operation performed by the image processing system according to an exemplary embodiment. The exemplary flow in FIG. 11 describes a flow of processing for searching for a network printer. The example illustrated in FIG. 11 includes steps S1101 through S1106.

Here, step S1101 can be implemented with the CPU 504 (FIG. 5) by reading and executing the control program stored in the ROM 505 and loaded on the RAM 506. Steps S1105 and S1106 can be implemented with the CPU 604 (FIG. 6) by reading and executing the control program stored in the ROM 605 and loaded on the RAM 606. Steps S1102 through S1104 can be implemented with the CPU 704 (FIG. 7) by reading and executing the control program stored in the ROM 705 and loaded on the RAM 706.

The flow of the processing in FIG. 11 is described as a series of processing for easier understanding of the processing performed by the image processing system according to the present exemplary embodiment. However, the processing can be described as a mutually independent processing flow. That is, the processing can be described as a mutually independent program. However, the processing can be implemented with a single CPU reading and executing one program stored in the ROM and loaded on the RAM.

First, a user generates an instruction for starting an operation for searching for an output device via the operation unit 600. More specifically, the user presses the NCB 1001 via the screen illustrated in FIG. 10A and further presses the "YES" button 1010 via the screen in FIG. 10B to generate an instruction for starting an operation for searching for an output device.

Referring to FIG. 11, in step S1101, the CPU 504 of the controller unit 500 of the MFP 101 sends to the server 105 a search command and a profile (image processing attribute) of the image data input unit 200 of the MFP 101 via the network I/F unit 507 of the controller unit 500 of the MFP 101.

After having received the search command, in step S1102, the CPU 704 of the server 105 sets the input device profile 902 of the image data input unit 200 of the MFP 101 as one argument for the color reproduction range checking function 901 in the CMM unit 703.

In step S1103, the CPU 704 of the server 105 serially extracts profiles of output devices on the network (the printer device profiles 903) from the network device information management unit 707 and sets the printer device profile 903 of the extracted output devices as the other arguments for the color reproduction range checking function 901 to perform calculation processing with the color reproduction range checking function 901.

In step S1104, the CPU 704 of the server 105 serially sends, to the controller unit 500 of the MFP 101, CMSs of the output devices on the network with respect to the image data input unit 200, on which the user has set the document, as return values calculated as a result of the calculation processing with the color reproduction range checking function 901 performed in step S1103.

Then, in step S1105, the operation unit 600 displays color matching information (color matching degree) generated based on the CMS as a result of the search for each output device in addition to the device name and the attribute data for each output device, as illustrated in the display screen in FIG. 1C.

In step S1106, the CPU 604 of the operation unit 600 of the image data input unit 200 determines whether the processing for sending the result of the calculation for the color matching status by the CPU 704 of the server 105 and the processing for displaying the result of the calculation on the display screen of the operation unit 600 have been completely performed with respect to all of the extracted candidate output devices on the network.

If it is determined in step S1106 that the processing for sending the result of the calculation for the color matching status by the CPU 704 of the server 105 and the processing for displaying the result of the calculation on the display screen of the operation unit 600 have been completely performed with respect to all of the extracted candidate output devices on the network (YES in step S1106), then the processing for searching for output devices ends. Here, the output devices on the network are previously registered on the MFP 101 or the server 105 in a predetermined scope (in a predetermined number of output devices). The search for the output device is performed based on the predetermined scope of search.

On the other hand, if it is determined in step S1106 that the processing for sending the result of the calculation for the color matching status by the CPU 704 of the server 105 and the processing for displaying the result of the calculation on the display screen of the operation unit 600 have not been completely performed with respect to all of the extracted candidate output devices on the network (NO in step S1106), then the processing returns to step S1103 to perform another iteration of the above-described processing.

The following advantageous effects can be achieved in the case of performing a remote copy using an MFP or a scanner device (input device) on a network and a printer (output device).

That is, in the present exemplary embodiment, matching information about a color reproduction capacity based on an image processing attribute of each of the input device and the output device is displayed. Accordingly, the user can select an output device that has the most appropriate color matching status.

In addition, it can be prevented that a color print product having an insufficient image quality is output, since the user can select an output device having the most appropriate color matching status, as described above. Furthermore, the user can perform a remote copy with an optimal output setting, regardless of the type of various output devices used in the remote copy.

As illustrated in FIG. 10C, in the present exemplary embodiment, the degree-of-fit indicator (status) 1025, which is an indicator of the degree of fit generated based on the CMS, includes three scales, such as "graphic", "office", and "monochromatic recommended".

Here, the description "graphic" indicates that the corresponding output device can reproduce a high-quality image such as a photograph and a superfine image (image having a high resolution). The description "office" indicates that the corresponding output device can reproduce an image having a simple graphic or color text data or having an image quality below that. The description "monochromatic recommended" indicates that the corresponding output device cannot reproduce an image in a color print mode with a sufficient image quality because of a possible variation of a color tint and a limited color reproduction capacity, and thus it is recommended that the user perform the designated copy operation in a monochromatic copy mode.

In the present exemplary embodiment, the color matching level is notified to the user in a character string. However, the present invention is not limited to this.

For example, the color matching level information can be described using numerical values in a predetermined scale, such as "1", "2", "3", "4", "5", and so on. Alternatively, the color matching level information can be described using a graphic (e.g., an icon) that can visually indicate the color matching level.

With the image processing system having the above-described configuration, the user can perform a network copy after setting, via the operation unit 600, information about whether to perform a color copy or a monochromatic copy based on the displayed color matching level on a specific output device that the user desires to perform the network copy.

In the present exemplary embodiment, the user presses the sort button 1020 (FIG. 10C) to designate an output device having a highest color matching level among the output devices extracted as a result of a search for an output device.

Thus, the extracted output devices can be displayed in descending order of the color matching level by sorting the output devices under the control of the CPU 604 of the operation unit 600. Accordingly, the user can easily select an output device having the highest degree of fit. The extracted candidate output devices can be previously sorted in a predetermined order to be displayed on the display screen of the operation unit 600.

Accordingly, the user can easily designate an output device having the highest color matching level from among the extracted candidate output devices and perform a color copy with the designated printer (output device).

The following advantageous effects can be achieved in the case of performing a remote copy by inputting an image of a document on an MFP or a scanner device (image data input device) on a network and outputting a read image of the document with a printer (image output device) on the network.

In the present exemplary embodiment, the color matching level of output devices, which are extracted as a result of a search for an output device, with an input device that is a source of the request of the search is displayed on the display screen of the operation unit 600. Thus, the user can easily recognize the color matching level of each of the extracted candidate output devices and perform a copy setting appropriate for the designated output device.

In addition, in the present exemplary embodiment, the candidate output devices can be sorted by the sorting function for sorting the devices based on the color matching level. Accordingly, the user can easily find an output device having the highest color matching level from among a plurality of candidate output devices extracted as a result of the search for an output device. Thus, the user can obtain a print product having a high image quality as a result of the color copy performed with the image forming apparatus according to the present exemplary embodiment.

Such a configuration of the present exemplary embodiment can be employed such that the above-described processing is performed in the case where the image data input unit 200 of the MFP 101 inputs color image data but is not performed in the case where the image data input unit 200 of the MFP 101 inputs monochromatic image data.

That is, if the image data input unit 200 has a function for inputting only monochromatic image data, or if the image data input unit 200 has a function for inputting color image data but it has been designated by the user to perform a reading operation in a monochromatic reading mode via the operation unit 600, the above-described processing is not performed in such a configuration of the immediately previous paragraph.

In this case, the MFP 101 (or the MFP 102) sends to the server 105 an image processing attribute of the MFP 101 (or the MFP 102) that indicates a monochromatic image reading capacity, receives from the server 105 only the information about the monochromatic/color attribute of the output devices on the network, and displays the result on the display screen of the operation unit 600.

Thus, the present exemplary embodiment having the above-described configuration can notify a result of the search for an output device according to whether the user desires to perform the printing operation in a color print mode or a monochromatic print mode. Accordingly, the user can easily designate an appropriate output device.

Second Exemplary Embodiment

Now, a second exemplary embodiment of the present invention will be described below. In the above-described first exemplary embodiment, in the case where a user inputs a document on the MFP 101 (or the MFP 102) or the image input device (the scanner 103) to perform a network copy by outputting the input document by the output device (the printer 104) on the network, the operation unit 600 of the MFP 101 (or the MFP 102) displays status information based on the color matching level. However, the output device may not have a function for correcting the gradation for securing a color reproduction capacity of the output device, which can degrade due to the number of times of use of the output device.

In this regard, in a second exemplary embodiment of the present invention, the MFP 101 (or the MFP 102) generates and receives a request to the server 105 for information about a history as to whether the output device has a gradation correction function for securing the color reproduction capacity of the output device, and based also on the result sent from the server 105, the MFP 101 (or the MFP 102) displays the status information according to the color matching level of the output device.

The configuration of the image processing system according to the present exemplary embodiment is similar to that of the first exemplary embodiment (FIG. 1). Accordingly, the configuration of the image processing system according to the present exemplary embodiment will not be described in detail here.

Figure 12:
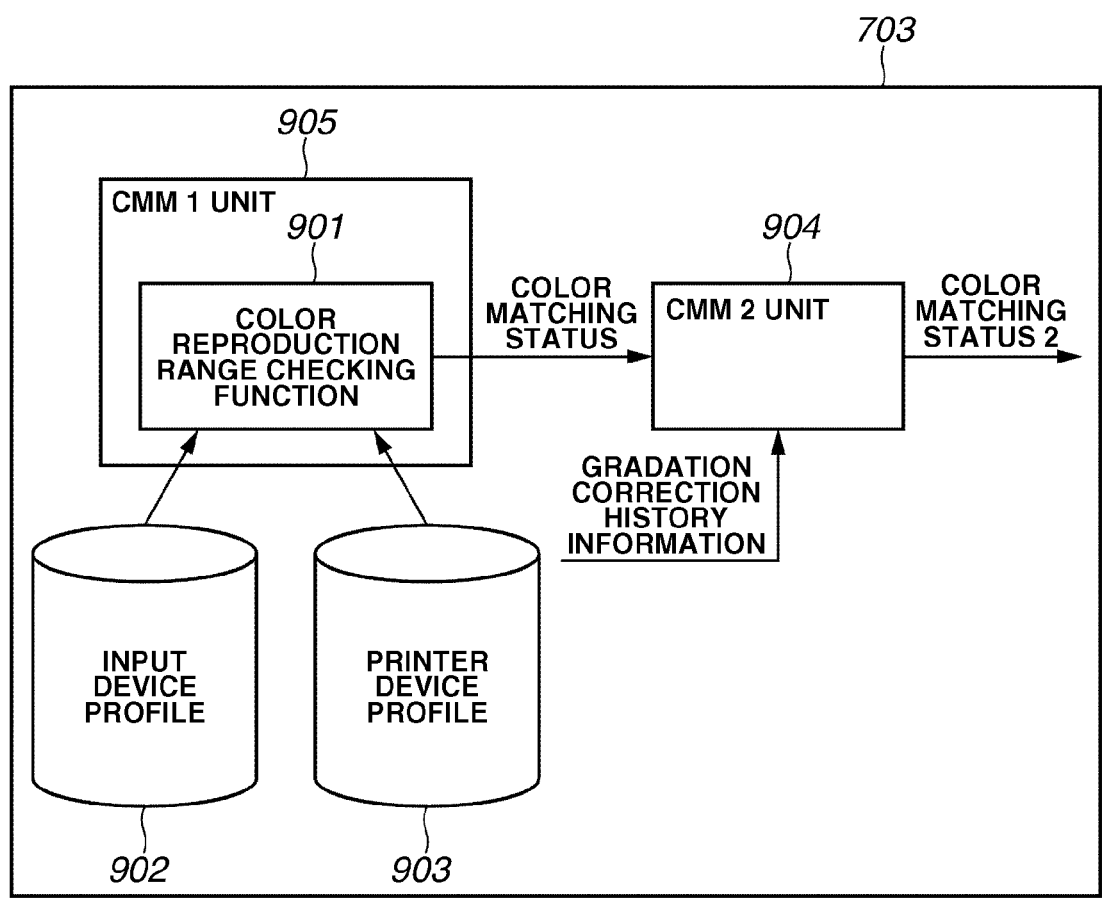
FIG. 12 illustrates an example of a configuration of a server apparatus in an image processing system according to a second exemplary embodiment of the present invention.

FIG. 12 illustrates an example of a configuration of the server 105 in the image processing system according to the second exemplary embodiment of the present invention. The example in FIG. 12 illustrates an example of a configuration of the CMM unit 703 of the server 105. In FIG. 12, components similar to those in FIG. 9 are in some instances provided with the same numerals and symbols.

In the present exemplary embodiment, the CMM 1 unit 905 compares the color reproduction range information of the input device and each of the output devices based on the profile information about each device and outputs color matching status information which indicates a degree of fit between the input device and each of the output devices, as in the first exemplary embodiment.

As described above with reference to FIG. 9, the input device profile 902 and the printer device profile 903 are input to the CMM 1 unit 905, and the input device profile 902 and the printer device profile 903 are processed using the color reproduction range checking function 901. Then, the CMM 1 unit 905 calculates a color matching level of the input device and the printer device based on the color reproduction ranges of the input device and the printer device using the color reproduction range checking function 901, and sends a result of the calculation as a CMS to the controller unit 500 of the MFP 101.

The CMM unit 703 according to the present exemplary embodiment further includes a CMM 2 unit 904. The CMM 2 unit 904 performs processing on the CMS, which is handled as one input, and on another input.

More specifically, the CMM 2 unit 904 performs processing on another input, which is history information about whether the output device on the network has the above-described gradation correction function. Here, the history information is centrally managed by the server 105 with the network device information management unit 707.

More specifically, the server 105 includes the CMM 2 unit 904 having a storage unit for storing information about a history of correction on an image output characteristic of each output device.

The CMM 2 unit 904 corrects the degree of fit calculated by the CMM 1 unit 905 based on the image output characteristic correction history information about each output device stored in the CMM 2 unit 904. Then, the server 105 sends the degree of fit corrected by the CMM 2 unit 904 to the input device. The processing to be subsequently performed is similar to that in the first exemplary embodiment.

Thus, the calculation for a CMS can be performed at a high accuracy based on the CMS input by the CMM 1 unit 905 and the gradation correction history information.

In the case where the input CMS is high, if no gradation correction history information is available (or if no gradation correction has been performed for a long period of time), then the CMM 2 unit 904 performs processing for decreasing the color matching level. Thus, the color matching status can be calculated at a high accuracy.

Now, processing for performing a network copy for reading an image of a document with the image data input unit 200 of the MFP 101 (FIG. 1) and outputting the read document image with the image output unit of the MFP 102, as in the first exemplary embodiment, will be described below.

The user places a document on the ADF of the image data input unit 200 of the MFP 101, and then performs a setting for the network copy via the operation unit 600. Then, the user presses the NCB 1001 on the screen of the operation unit 600 (FIG. 10A).

Then, the CPU 604 changes the screen to a screen illustrated in FIG. 10B, via which the user can search for and select an output device for outputting the image of the document, from among the MFPs and the printers on the network.

When the user presses a "YES" button 1010 on the screen for searching for a network printer, the CPU 504 of the controller unit 500 of the MFP 101 starts searching for an output device on the network.

Now, a flow of processing according to the present exemplary embodiment will be described below with reference to the flow chart of FIG. 13.

Figure 13:
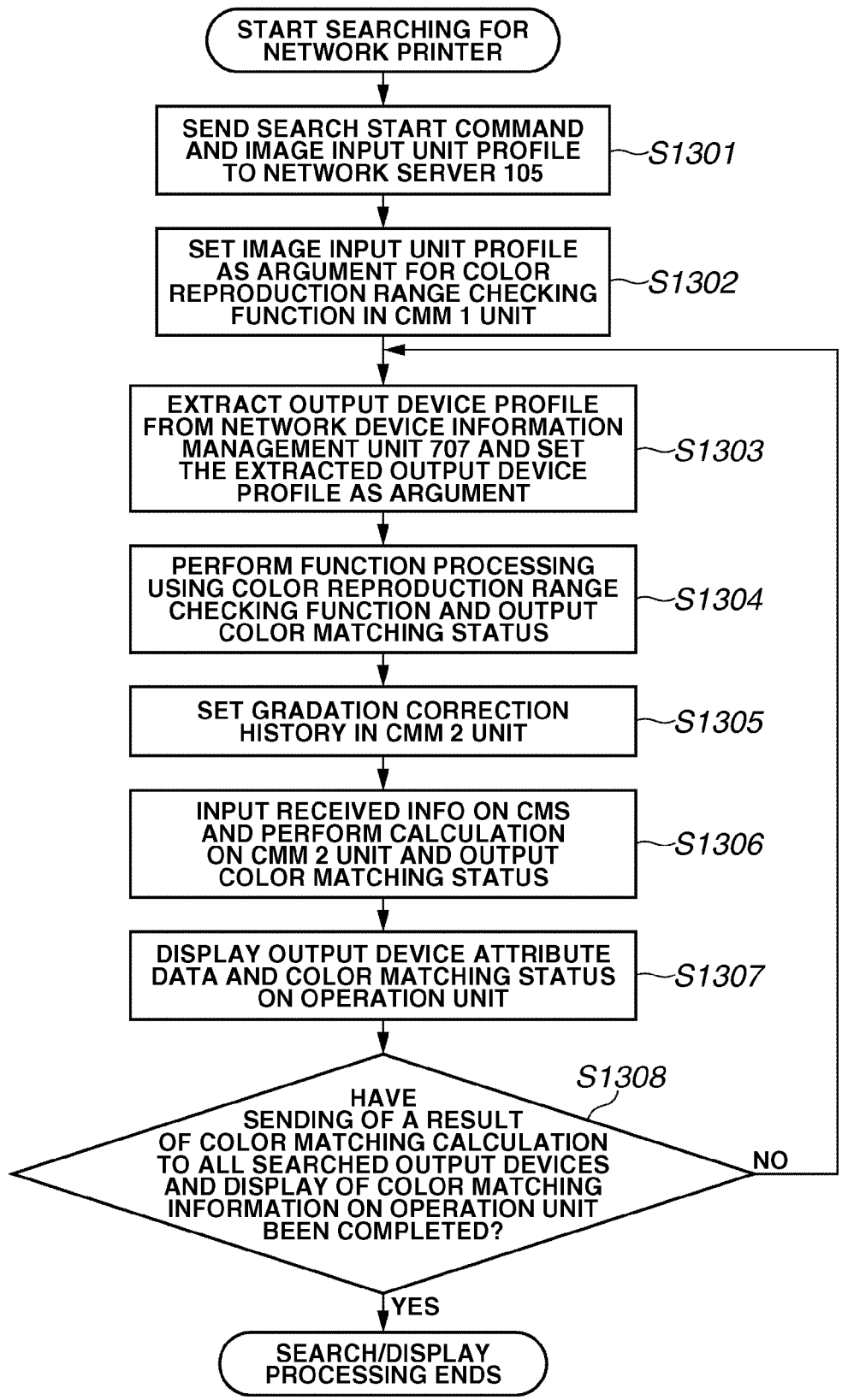
FIG. 13 is a flow chart illustrating an example of a data processing operation performed by the image processing system according to the second exemplary embodiment of the present invention.

FIG. 13 is a flow chart illustrating an example of a data processing operation performed by the image processing system according to the present exemplary embodiment. The exemplary flow in FIG. 13 describes a flow of processing for searching for a network printer. The example illustrated in FIG. 13 includes steps S1301 through S1308.

Here, step S1301 can be implemented with the CPU 504 (FIG. 5) by reading and executing the control program stored in the ROM 505 and loaded on the RAM 506. Steps S1307 and S1308 can be implemented with the CPU 604 (FIG. 6) by reading and executing the control program stored in the ROM 605 and loaded on the RAM 606. Steps S1302 and S1306 can be implemented with the CPU 704 (FIG. 7) by reading and executing the control program stored on the ROM 705 and loaded on the RAM 706.

The flow of the processing in FIG. 11 is described as a series of processing for easier understanding of the processing performed by the image processing system according to the present exemplary embodiment. However, the processing can be described as a mutually independent processing flow. That is, the processing can be described as a mutually independent program. However, the processing can be implemented with a single CPU reading and executing one program stored in the ROM and loaded on the RAM.

First, a user generates an instruction for starting an operation for searching for an output device via the operation unit 600.

Referring to FIG. 13, in step S1301, the CPU 504 of the controller unit 500 of the MFP 101 sends to the server 105 a search command and a profile (image processing attribute) of the image data input unit 200 of the MFP 101 via the network I/F unit 507 of the controller unit 500 of the MFP 101.

After having received the search command, in step S1302, the CPU 704 of the server 105 sets the input device profile 902 of the image data input unit 200 of the MFP 101 as one argument for the color reproduction range checking function 901 in the CMM 1 unit 905.

In step S1303, the CPU 704 of the server 105 serially extracts profiles of output devices on the network (the printer device profiles 903) from the network device information management unit 707 and sets the printer device profile 903 of the extracted output devices as the other arguments for the color reproduction range checking function 901 to perform calculation processing with the color reproduction range checking function 901.

In step S1304, the CPU 704 of the server 105 serially sends, to the controller unit 500 of the MFP 101, CMSs of the output devices on the network with respect to the image data input unit 200, on which the user has set the document, as return values calculated as a result of the calculation processing with the color reproduction range checking function 901 performed in step S1303.

In step S1305, the CPU 704 of the server 105 extracts the gradation correction history 806 of the output device from the database 800 held in the network device information management unit 707. Then, the CPU 704 sets the extracted gradation correction history 806 in the CMM 2 unit 904.

In step S1306, the received information about the CMS is input to the CMM 2 unit 904. Furthermore, in step S1306, the CMM 2 unit 904 compares the color reproduction ranges of the input device and the output device, performs a calculation on the CMS based on a result of the comparison between the color reproduction ranges and a condition of the color reproduction capacity after the gradation correction by the output device, and then outputs resulting final CMSs.

Then, the CPU 704 of the server 105 sends to the MFP 101 the color matching information generated based on the CMS as a result of the search for an output device, in addition to the device name and the attribute data for each output device, as illustrated in the display screen in FIG. 10C in the first exemplary embodiment.

In step S1307, the operation unit 600 displays on the display screen the received color matching information (color matching degree) generated based on the CMS as a result of the search for an output device, in addition to the device name and the attribute data for each output device.

In step S1308, the CPU 604 of the operation unit 600 of the image data input unit 200 determines whether the processing for sending the result of the calculation for the color matching status by the CPU 704 of the server 105 and the processing for displaying the result of the calculation on the display screen of the operation unit 600 have been completely performed with respect to all of the extracted candidate output devices on the network.

If it is determined in step S1308 that the processing for sending the result of the calculation for the color matching status by the CPU 704 of the server 105 and the processing for displaying the result of the calculation on the display screen of the operation unit 600 have been completely performed with respect to all of the extracted candidate output devices on the network (YES in step S1308), then the processing for searching for an output device ends.

On the other hand, if it is determined in step S1308 that the processing for sending the result of the calculation for the color matching status by the CPU 704 of the server 105 and the processing for displaying the result of the calculation on the display screen of the operation unit 600 have not been completely performed with respect to all of the extracted candidate output devices on the network (NO in step S1308), then the processing returns to step S1303 to perform another iteration of the above-described processing.

In the present exemplary embodiment, in the case where the user has generated an instruction for starting a document reading operation with the copy setting for a color copy in a state where the output device having the color matching status "monochromatic recommended", a warning message is displayed on the operation screen of the operation unit 600.

Figure 14:
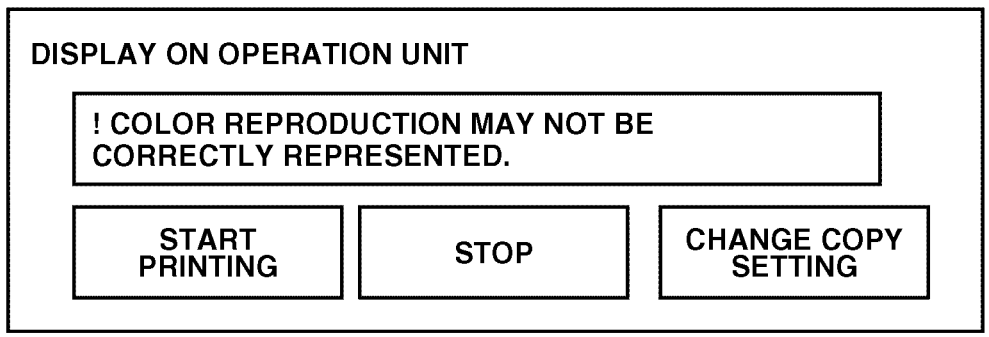
FIG. 14 illustrates an example of a configuration of a screen indicating a warning message displayed on the operation unit illustrated in FIG. 6, via which a user can perform an operation for starting a print operation, according to the second exemplary embodiment of the present invention.
Figure 16:
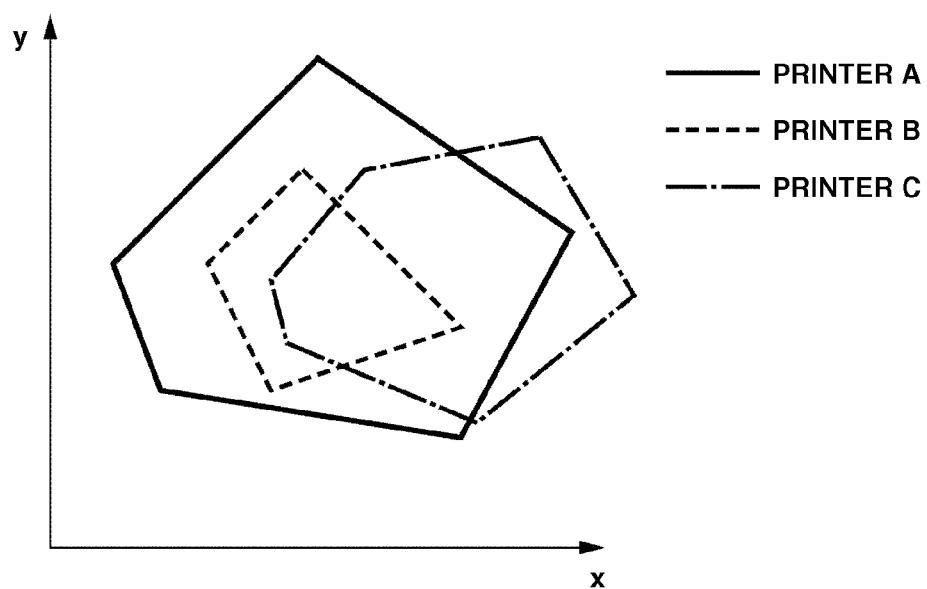
FIG. 16 illustrates an area characteristic of a color space related to color reproduction characteristics of an image output device.

More specifically, the CPU 604 of the operation unit 600 of the MFP 101 displays a warning message "Color reproduction may not be correctly represented" on the operation screen of the operation unit 600, as illustrated in FIG. 14.

FIG. 14 illustrates an example of a configuration of a screen indicating a warning message displayed on the operation unit 600 (FIG. 6) and a content of an operation that the user can perform according to an exemplary embodiment.

The warning message in FIG. 14 is displayed if it is determined by the CPU 504 that the image quality of a print product to be output may be degraded if the user continues to perform the copy with the output device having a low color matching level with the input device, using the copy settings performed by the user.

More specifically, when the user has selected an output device from among the output devices listed on the display screen of the operation unit 600, the CPU 604 displays a warning message on a display unit for notifying the user that the image quality of a print product to be output may be degraded according to the degree of fit of the selected output device.

The warning message is not displayed in the case where the user has previously designated to read the input document in a monochromatic reading mode via the operation unit 600.

Such a configuration can be employed that after the user has set a condition for outputting on the output device selected from among the output devices displayed as a list on the operation screen of the operation unit 600, if it is determined by the CPU 504 that the image quality of a print product to be output may be degraded as a result of a comparison between the information as to the degree of fit set in the condition and the actual degree of fit of the selected output device.

With the above-described configuration, the user can perform an operation for selecting another output device or perform the copy with a different new copy setting appropriate for printing out the document, without erroneously copying the document with a setting by which the image quality of a print product of the input document can be degraded.

As described above, in the present exemplary embodiment, image data obtained by reading an image of a document with the image input device such as the MFP 101 or the scanner 103 on the network is input. Furthermore, in the case of performing a network copy for outputting the input image of the document with an output device (the printer 104) on the network, the degree of fit between the image processing attributes of the input device and the output device is determined based on two different types of information.

For example, the degree of fit between the image processing attributes of the input device and the output device can be determined based on information about the color matching level between the input device and the output device extracted as a result of the search for an output device and history information about whether the output device has a function for correcting the gradation for securing the color reproduction capacity of the output device.

The extracted candidate output devices are sorted on the display screen of the operation unit 600 under the control of the CPU 604 based on the above-described two types of information. Accordingly, the user can select an appropriate output device having the highest color matching level at a higher accuracy than that in the first exemplary embodiment.

With the above-described configuration, the user can perform a copy setting appropriate for the color reproduction range of the input device in performing a network copy.

In addition, according to the present exemplary embodiment, if it is determined by the CPU 504 that the image quality of a print product to be output may be degraded if the user continues to perform the copy with the output device having a low color matching level with the input device, using the copy settings performed by the user, then a warning message (FIG. 14) is displayed. Accordingly, it can be prevented that the user erroneously continues to perform the copy operation of the document with a setting by which the image quality of a print product of the input document can be degraded.

In the above-described first and the second exemplary embodiments, in displaying the display screen illustrated in FIG. 10C, if the input device is an MFP having a function as an output device, the degree-of-fit indicator for the output device connected to the input device via the network can be displayed in a manner by which the degree of fit of the output device can be compared with the degree of fit of the output device of the MFP (the image output unit 100).

More specifically, in this case, the list of output devices illustrated in FIG. 10C can include the image output unit 100 of the MFP 101. Furthermore, the display screen displaying the image output unit 100 in addition to the output devices can include information about whether each of the output devices can only output an image of the input document with an image quality lower than the image output unit 100, or can display a message to the user notifying that the output device can only output the image of the input document with a image quality lower than the image output unit 100.

In addition, a level of difference between a print product to be output with the output device and a print product to be output with the image output unit 100 can be displayed with a plurality of levels (scales).

Accordingly, the user can select an output device after recognizing the difference between the image quality of a print product in the case of outputting the document image with the output device on the network (image quality in the case of a network copy) and the image quality of the image output unit 100 (image quality in the case of a local copy).

In the above-described first and the second exemplary embodiments, the server 105 is connected to the input device via the network. However, the present invention is not limited to this. The functions of the server 105 can be provided to the input device (the MFP 101) to cause the MFP 101 to determine the above-described degree of fit with the MFP 101 itself.

According to the first and the second exemplary embodiments of the present invention having the above-described configuration, the degree of fit between the input device and each of a plurality of output devices connected to the input device via the network can be determined at a high accuracy. Thus, the user can easily designate an appropriate output device.

Third Exemplary Embodiment

Herein below, the configuration of a data processing program that can be read by an image processing system including an image processing apparatus and a server apparatus according to an exemplary embodiment of the present invention is described with reference to a memory map illustrated in FIG. 15.

FIG. 15 illustrates a memory map of a storage medium that stores various data processing programs that can be read by the image processing apparatus (the MFP 101 and the MFP 102) and the server apparatus (the server 105) in the image processing system according to an exemplary embodiment of the present invention.

Although not illustrated in FIG. 15, information for managing the programs stored in the storage medium, such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments illustrated in FIG. 11 and FIG. 13 can be implemented by a host computer using a program that is externally installed. In this case, the present invention is applied to the case where a group of information including a program is supplied to an output device from a storage medium, such as a CD-ROM, a flash memory, and a floppy disk (FD), or from an external storage medium via a network.

The present invention can also be achieved by providing a system or an apparatus with a storage medium storing software program code implementing the functions of the above-described exemplary embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk (MO), a compact disc-read only memory (CD-ROM), a compact disc recordable (CD-R), a compact disc rewritable (CD-RW), a magnetic tape, a nonvolatile memory card, a ROM, and a digital versatile disc (DVD (a DVD-recordable (DVD-R), DVD-read only memory (DVD-ROM), and a DVD-rewritable (DVD-RW)), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above-described embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in an exemplary embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-333348 filed Dec. 11, 2006, which is hereby incorporated by reference herein in its entirety.

What is claimed is:

1. An image processing apparatus capable of communicating with an output device via a network, comprising:
   an acquisition unit configured to acquire an output quality of the output device which outputs image data input to the image processing apparatus, the output quality being selected by a user in a case where image data input to the image processing apparatus is output from the output device, the output quality being determined based on a size of an area where a range of color reproducible by the image processing apparatus to which the image data is input and a range of color reproducible by the output device from which the image data is to be output overlap each other; and
   a display unit configured to display the output quality of the output device acquired by the acquisition unit and information indicating the output device which outputs the image data with the output quality.

2. The image processing apparatus according to claim 1, further comprising:
   a selection unit configured to select the output device displayed in the display unit,
   wherein the display unit displays warning information based on the output quality of the image data output from the selected output device.

3. The image processing apparatus according to claim 1, wherein the acquisition unit acquires a plurality of output qualities for each of a plurality of output devices capable of communicating with the image processing apparatus, and the display unit displays a list of the plurality of output qualities acquired by the acquisition unit.

4. The image processing apparatus according to claim 3, wherein the display unit displays the list of the plurality of output qualities in descending order of output quality or in ascending order of output quality.

5. A server apparatus capable of communicating with an input device for inputting image data and an output device for outputting image data via a network, comprising:
   a receiving unit configured to receive a range of color reproducible by the input device and a range of color reproducible by the output device;
   a determination unit configured to determine an output quality of the output device which outputs image data input to the input device based on a size of an area where the range of color reproducible by the input device and the range of color reproducible by the output device, each received by the receiving unit, overlap each other, the output quality being selected by a user in a case where image data input to the image processing apparatus is output from the output device; and
   a transmitting unit configured to transmit the determined output quality of the output device to the input device in order to display, in the input device, the output quality of the output device and information indicating the output device which outputs the image data with the output quality.

6. The server apparatus according to claim 5, further comprising:
   an acquisition unit configured to acquire a correction history of an output characteristic of the output device; and
   a correction unit configured to correct the determined output quality based on the correction history acquired by the acquisition unit.

7. A method for controlling an image processing apparatus capable of communicating with an output device via a network, comprising:
   acquiring an output quality of the output device which outputs image data input to the image processing apparatus, the output quality being selected by a user in a case where image data input to the image processing apparatus is output from the output device, the output quality being determined based on a size of an area where a range of color reproducible by the image processing apparatus to which the image data is input and a range of color reproducible by the output device from which the image data is to be output overlap each other; and
   displaying information indicating the acquired output quality of the output device and the output device which outputs the image data with the output quality.

8. A non-transitory computer readable storage medium storing instructions which, when executed by an apparatus, cause the apparatus to perform the method according to claim 7.

9. A method for controlling a server apparatus capable of communicating with an input device for inputting image data and an output device for outputting image data via a network, comprising:
   receiving a range of color reproducible by the input device and a range of color reproducible by the output device;
   determining an output quality of the output device which outputs image data input to the input device based on a size of an area where the received range of color reproducible by the input device and the received range of color reproducible by the output device overlap each other, the output quality being selected by a user in a case where image data input to the image processing apparatus is output from the output device; and
   transmitting the determined output quality of the output device to the input device in order to display, in the input device, the output quality of the output device and information indicating the output device which outputs the image data with the output quality.

10. A non-transitory computer readable storage medium storing instructions which, when executed by an apparatus, cause the apparatus to perform the method according to claim 9.

* * * * *